(12) United States Patent
Smith

(10) Patent No.: US 7,583,397 B2
(45) Date of Patent: Sep. 1, 2009

(54) METHOD FOR GENERATING A DISPLAY LIST

(75) Inventor: David Christopher Smith, Quakers Hill (AU)

(73) Assignee: Canon Kabushiki Kaisha, Tokyo (JP)

(*) Notice: Subject to any disclaimer, the term of this patent is extended or adjusted under 35 U.S.C. 154(b) by 940 days.

(21) Appl. No.: 10/952,902

(22) Filed: Sep. 30, 2004

(65) Prior Publication Data

US 2005/0067498 A1    Mar. 31, 2005

(30) Foreign Application Priority Data

Sep. 30, 2003    (AU)    ............................... 2003905339

(51) Int. Cl.
*G06F 15/00*    (2006.01)
*G06K 1/00*    (2006.01)

(52) U.S. Cl. .................. 358/1.15; 358/1.1; 358/1.9; 358/1.12; 358/1.13; 358/1.14; 345/471; 345/467; 345/611

(58) Field of Classification Search ................ 358/1.1, 358/1.15, 1.9, 1.12–1.14; 345/471, 467, 345/611; 715/273; 382/260
See application file for complete search history.

(56) References Cited

U.S. PATENT DOCUMENTS

| 4,079,458 | A | 3/1978 | Rider et al. ................ 364/900 |
|---|---|---|---|
| 5,138,696 | A | 8/1992 | Nagata ........................ 395/110 |
| 5,293,587 | A | 3/1994 | Deb et al. .................... 395/162 |
| 5,410,640 | A | 4/1995 | Morikawa et al. ........... 395/110 |
| 6,252,671 | B1 | 6/2001 | Peng et al. ................. 358/1.11 |
| 6,253,221 | B1 | 6/2001 | Kim ........................... 707/536 |
| 6,313,920 | B1 | 11/2001 | Dresevic et al. ............ 358/1.11 |
| 6,421,055 | B1 * | 7/2002 | Jones et al. ................. 345/471 |
| 6,657,625 | B1 * | 12/2003 | Chik et al. ................... 345/467 |
| 6,760,029 | B1 * | 7/2004 | Phinney et al. ............. 345/471 |
| 6,952,210 | B1 * | 10/2005 | Renner et al. ............... 345/471 |
| 7,034,845 | B2 * | 4/2006 | Perry et al. ................. 345/611 |
| 7,079,264 | B2 * | 7/2006 | Nguyen et al. ............... 358/1.1 |
| 7,106,332 | B2 * | 9/2006 | Perry et al. ................. 345/467 |
| 7,130,480 | B2 * | 10/2006 | Betrisey et al. ............. 382/260 |
| 7,168,036 | B2 * | 1/2007 | Klotz et al. ................. 715/273 |

* cited by examiner

*Primary Examiner*—Edward L Coles
*Assistant Examiner*—Satwant K Singh
(74) *Attorney, Agent, or Firm*—Fitzpatrick, Cella, Harper & Scinto

(57) ABSTRACT

A method and apparatus for generating a display list, for use in rendering a plurality of glyphs, is disclosed. The method creates a display list for storing representations of the glyphs and stores at least a first one of the glyphs in the display list as a bitmap representation depending on one or more predetermined criteria. The at least first one of the glyphs may alternatively be stored in the display list as a vector representation.

28 Claims, 21 Drawing Sheets

| Event | | | Directive setting |
|---|---|---|---|
| start-of-document | | | Initialize modules |
| start-of-page | | | IF glyph-pool-is-full<br>   new-directive = trace<br>   old-directive = default<br>ELSE<br>   new-directive = pool<br>   old-directive = pool<br>ENDIF |
| object processing events | add-non-text<br>*Hit DL resource limit* | | new-directive = trace<br>old-directive = trace |
| | String - processing events (indivisible) | add-pool<br>*Hit pool full* | new-directive = trace<br>old-directive = default |
| | | add-bitmap-primitive<br>*DL resource limit* | new-directive = trace<br>old-directive = trace |
| | | add-bitmap-primitive<br>*Hit bitmap limit* | new-directive = trace<br>old-directive = trace |
| | add-non-text<br>*DL resource limit* | | new-directive = trace<br>old-directive = trace |
| end-of-page<br>*Hit DL size limit* | | | Construct DL or Generate software fallback DL |
| End-of-document | | | Free modules |

Fig. 8

METHOD FOR GENERATING A DISPLAY LIST

CROSS-REFERENCE TO RELATED PATENT APPLICATIONS

This application claims the right of priority under 35 U.S.C. § 119 based on Australian Patent Application No 2003905339, filed 30 Sep. 2003 which is incorporated by reference herein in its entirety as if fully set forth herein.

FIELD OF THE INVENTION

The present invention relates generally to printing and, in particular, to a method and apparatus for generating a display list for use in rendering, and to a computer program product including a computer readable medium having recorded thereon a computer program for generating a display list for use in rendering.

BACKGROUND

On most modern computers, the process of printing a page of a document comprises a number of steps. Firstly, a software application executing on the computer receives a command to print one or more pages of document. In response, the application sends drawing commands to a "graphics device interface layer" of an operating system of the computer. The graphics device interface layer then sends the drawing commands to a printer driver software module associated with a target printer and which is typically resident on the computer.

Each drawing command is typically referred to as a graphics object. For each graphics object, the printer driver is responsible for generating a description of the graphics object in a format that the target printer can understand. Such a format is referred to as a "page description language". The printer driver generates a final description of the page to be printed including a description of each of the graphics objects. Such a final description is referred to as a "display list (DL)".

The display list for the page to be printed is spooled to the target printer. The target printer contains a "page description language interpreter" and a raster image processor (RIP) that interprets the display list and renders the display list as pixel values comprising C, M, Y and K channels. The printer then uses the pixel values to print the page.

Some advanced page description languages provide highly functional commands for drawing text. For example, the following command (1) selects twelve point "Times Roman" font to use for subsequent text output:

set_font("Times Roman", 12)     (1)

As another example, a number of commands may be issued to draw strings of graphical objects, representing text characters referred to as glyphs, for example, at various locations on a page. The following command (2) draws text starting at location x=20, y=50 on a page.

draw_text(20, 50, "The quick brown fox")     (2)

Such an advanced page description language is typically employed in modern Laser printers.

Sending high-level commands such as those described above to a printer is only possible when the printer has the ability to generate a bitmap of (i.e., rasterize) each glyph from a given font description. The generation of such a bitmap in a printer is typically performed by a component in the printer referred to as a "font rasterizing engine." For each glyph in a string, a font rasterizing engine rasterizes the glyph and positions the glyph on a page to be printed.

A font description is typically stored as a file in a particular format. One example of a font format is known as the "TrueType Font" format.

Printing systems typically contain a minimal set of printer-resident fonts, which are commonly used fonts (e.g., Times Roman or Courier). When a font is not resident in a printer but is required to render a page, then a font file corresponding to the font is typically downloaded to the printer. Virtually all font rasterizing engines can render fonts in the TrueType font format. Alternatively, if a font format is not recognized by a font rasterizing engine, then an associated printer driver may employ font substitution to match original glyphs with similar glyphs in a known font format. However, if a font cannot be downloaded or a substitution is not appropriate, then a printer driver can request the graphics device interface layer of an associated operating system to convert corresponding glyphs to either bitmap representations or vector representations, as preferred, during generation of a display list. The bitmap representations or vector representations may then be rendered by a printer simply as bitmap or vector graphics primitives without requiring pre-processing by the font rasterizing engine.

Another type of page description language that is used in some printing systems is one that is only capable of rendering image data for a page. Such a page description language is typically employed in inkjet printing systems. In such systems, an associated printer driver contains a raster image processor and renders an entire page of graphics objects as a halftoned image. The image data is then sent to a target printer on a per-band basis and printed.

Still another type of page description language is capable of rendering and compositing both vector graphics primitives and bitmap primitives. However, such a page description language has no font-rasterizing capabilities.

In recent times, font rasterizing software within the graphics device interface layer of a computer has been used for generating bitmap or vector graphics representations of glyphs. As a result, font rasterizing engines and associated printer-resident fonts are no longer required in printers. The advantages of not using the font rasterizing engine and associated printer-resident fonts are that memory and processing requirements in such printers are somewhat simplified and as a result, the cost of the associated printer may be reduced accordingly.

A printer driver associated with the printers described above which do not comprise a font rasterizing engine and associated printer-resident fonts, can construct a display list such that glyphs are added as bitmap representations or vector graphics primitives. The raster image processor of such printer may be configured for rendering edges. Such an edge rendering raster image processor typically renders glyphs as vector graphics primitives.

A page description language for an edge rendering raster image processor may describe an edge by an edge-record. An edge record locates the starting position of the edge on a page to be printed plus a list of points relative to the starting point. The list of points proceeds in a monotonically increasing fashion down the page and is referred to as the segment list. An object such as a glyph may be described by many such edge records.

For example, FIG. 2a shows a page 200 comprising two characters 201 and 202 using the same glyph 'A'. FIG. 2b shows the page 200, arrows (e.g., 203) representing edge records E1 to E6 associated with the character 201 and arrows (e.g., 207) representing edge records E7 to E12 associated with the character 202. FIG. 2b also shows a representation of a segment list S1 associated with the characters 201 and 202. As represented by FIG. 2b, the edge-record E1 points to the segment list S1. The segment list SI defines the shape of an edge 205 of the character 201. Segment lists such as the segment list SI may be shared between characters on a page since the segment lists are relative to the start of the edge. Segment lists may also be shared between pages (i.e., display lists representing such pages) of a document. As seen in FIG. 2b, an edge 207 of the character 202 also points to the segment list S1. Edge records cannot be shared since edge records store the location of an edge in absolute device coordinates.

FIG. 2c shows a representation of a display list 209 for the page 200. The display list 209 contains the twelve edge records E1 to E12 and the six segment lists S1 to S6.

For a complex font, such as a font representing a Kanji character set, many edge records may be needed to describe a single glyph of the character set. For example, FIG. 3 shows a glyph 300, which requires thirty four (34) edge records to describe the glyph. When there are several thousand such glyphs on a page, then the number of edge records becomes so large that any advantage gained by using edges to render a glyph is lost due to the time to spool an associated display list containing the edge records.

As an example, a page comprising five thousand kanji characters may require over one hundred and thirty three thousand edges. If each edge record is represented by nine bytes, then the display list for the edge records alone is represented by at least one point one (1.1) megabytes of data. For a one hundred page document, the edge records alone require one hundred and ten (110) megabytes of data. As a result, the time to spool the display lists containing the one hundred and ten (110) megabytes of edge records is large.

Thus, a need clearly exists for an improved method of generating a display list for use in rendering.

SUMMARY

It is an object of the present invention to substantially overcome, or at least ameliorate, one or more disadvantages of existing arrangements.

According to a first aspect of the present disclosure, there is provided a method of generating a display list, for use in rendering a plurality of glyphs, said method comprising the steps of:

(i) creating a display list for storing representations of said glyphs; and (ii) storing at least a first one of said glyphs in said display list as a bitmap representation depending on one or more predetermined criteria, otherwise storing said at least first one of said glyphs in said display list as a vector representation; and (iii) repeating step (ii) for at least a subsequent one of said plurality of glyphs to generate said display list.

According to another aspect of the present invention there is provided a method of rendering a plurality of glyphs, said method comprising the steps of:

(i) creating a display list for storing representations of said glyphs;

(ii) storing at least a first one of said glyphs in said display list as a bitmap representation depending on one or more predetermined criteria, otherwise storing said at least first one of said glyphs in said display list as a vector representation; and (iii) repeating step (ii) for at least a subsequent one of said plurality of glyphs; and (iv) rendering said plurality of glyphs using said display list.

According to still another aspect of the present invention there is provided a method of rendering a document comprising a plurality of pages, at least one of said pages comprising a plurality of glyphs, said method comprising the steps of:

creating a display list for storing at least representations of said glyphs;

storing at least a first one of said glyphs in said display list as a bitmap representation depending on one or more predetermined criteria; and rendering said document using said display list, said display list being partitioned such that bitmap data associated with said bitmap representations is stored in a contiguous section of said display list, wherein the contiguous bitmap data section of said display list is persistent between pages of said document being rendered.

According to still another aspect of the present invention there is provided an apparatus for generating a display list, for use in rendering a plurality of glyphs, said apparatus comprising:

means for creating a display list for storing representations of said glyphs; and means for storing at least a first one of said glyphs in said display list as a bitmap representation depending on one or more predetermined criteria, otherwise storing said at least first one of said glyphs in said display list as a vector representation, and for storing at least a subsequent one of said glyphs in said display list as a bitmap representation or a vector representation depending on said one or more predetermined criteria.

According to still another aspect of the present invention there is provided an apparatus for rendering a plurality of glyphs, said apparatus comprising:

means for creating a display list for storing representations of said glyphs;

means for storing at least a first one of said glyphs in said display list as a bitmap representation depending on one or more predetermined criteria, otherwise storing said at least first one of said glyphs in said display list as a vector representation and for storing at least a subsequent one of said glyphs in said display list as a bitmap representation or a vector representation depending on said one or more predetermined criteria; and means for rendering said plurality of glyphs using said display list.

According to still another aspect of the present invention there is provided an apparatus for rendering a document comprising a plurality of pages, at least one of said pages comprising a plurality of glyphs, said apparatus comprising:

means for creating a display list for storing at least representations of said glyphs;

means for storing at least a first one of said glyphs in said display list as a bitmap representation depending on one or more predetermined criteria; and means for rendering said document using said display list, said display list being partitioned such that data associated with said bitmap representations is stored in a contiguous section of said display list, wherein the contiguous bitmap data section of said display list is persistent between pages of said document being rendered.

According to still another aspect of the present invention there is provided a computer program for generating a display list, for use in rendering a plurality of glyphs, said program comprising:

code for creating a display list for storing representations of said glyphs; and code for storing at least a first one of said glyphs in said display list as a bitmap representation depending on one or more predetermined criteria, otherwise storing said at least first one of said glyphs in said display list as a vector representation, and for storing at least a subsequent one of said glyphs in said display list as a bitmap representation or a vector representation depending on said one or more predetermined criteria.

According to still another aspect of the present invention there is provided a computer program for rendering a plurality of glyphs, said program comprising:

code for creating a display list for storing representations of said glyphs;

code for storing at least a first one of said glyphs in said display list as a bitmap representation depending on one or more predetermined criteria, otherwise storing said at least first one of said glyphs in said display list as a vector representation and for storing at least a subsequent one of said glyphs in said display list as a bitmap representation or a vector representation depending on said one or more predetermined criteria; and code for rendering said plurality of glyphs using said display list.

According to still another aspect of the present invention there is provided a computer program for rendering a document comprising a plurality of pages, at least one of said pages comprising a plurality of glyphs, said program comprising:

code for creating a display list for storing at least representations of said glyphs;

code for storing at least a first one of said glyphs in said display list as a bitmap representation depending on one or more predetermined criteria; and means for rendering said document using said display list, said display list being partitioned such that data associated with said bitmap representations is stored in a contiguous section of said display list, wherein the contiguous bitmap data section of said display list is persistent between pages of said document being rendered.

According to still another aspect of the present invention there is provided a computer program product having a computer readable medium having a computer program recorded therein for generating a display list, for use in rendering a plurality of glyphs, said computer program product comprising:

computer program code means for creating a display list for storing representations of said glyphs; and computer program code means for storing at least a first one of said glyphs in said display list as a bitmap representation depending on one or more predetermined criteria, otherwise storing said at least first one of said glyphs in said display list as a vector representation, and for storing at least a subsequent one of said glyphs in said display list as a bitmap representation or a vector representation depending on said one or more predetermined criteria.

According to still another aspect of the present invention there is provided a computer program product having a computer readable medium having a computer program recorded therein for rendering a plurality of glyphs, said computer program product comprising:

computer program code means for creating a display list for storing representations of said glyphs;

computer program code means for storing at least a first one of said glyphs in said display list as a bitmap representation depending on one or more predetermined criteria, otherwise storing said at least first one of said glyphs in said display list as a vector representation and for storing at least a subsequent one of said glyphs in said display list as a bitmap representation or a vector representation depending on said one or more predetermined criteria; and computer program code means for rendering said plurality of glyphs using said display list.

According to still another aspect of the present invention there is provided a computer program product having a computer readable medium having a computer program recorded therein for rendering a document comprising a plurality of pages, at least one of said pages comprising a plurality of glyphs said computer program product comprising:

computer program code means for creating a display list for storing at least representations of said glyphs;

computer program code means for storing at least a first one of said glyphs in said display list as a bitmap representation depending on one or more predetermined criteria; and computer program code means for rendering said document using said display list, said display list being partitioned such that data associated with said bitmap representations is stored in a contiguous section of said display list, wherein the contiguous bitmap data section of said display list is persistent between pages of said document being rendered.

According to still another aspect of the present invention there is provided an apparatus for generating a display list, for use in rendering a plurality of glyphs, said apparatus comprising:

processor for creating a display list in a memory of said apparatus, said display list being configured for storing representations of said glyphs, wherein said processor is further configured for storing at least a first one of said glyphs in said display list as a bitmap representation depending on one or more predetermined criteria, otherwise storing said at least first one of said glyphs in said display list as a vector representation, and for storing at least a subsequent one of said glyphs in said display list as a bitmap representation or a vector representation depending on said one or more predetermined criteria.

Other aspects of the invention are also disclosed.

BRIEF DESCRIPTION OF THE DRAWINGS

Some aspects of the prior art and one or more embodiments of the present invention will now be described with reference to the drawings and appendices, in which:

FIG. 2b shows the page of FIG. 2a and arrows representing the edge records associated with the characters of FIG. 2a;

FIG. 2c shows a representation of a display list for the page of FIG. 2a;

FIG. 4b represents a display list for the page of FIG. 4a;

FIG. 8 shows a table summarising the setting of new and old directives;

DETAILED DESCRIPTION INCLUDING BEST MODE

Figure 1:
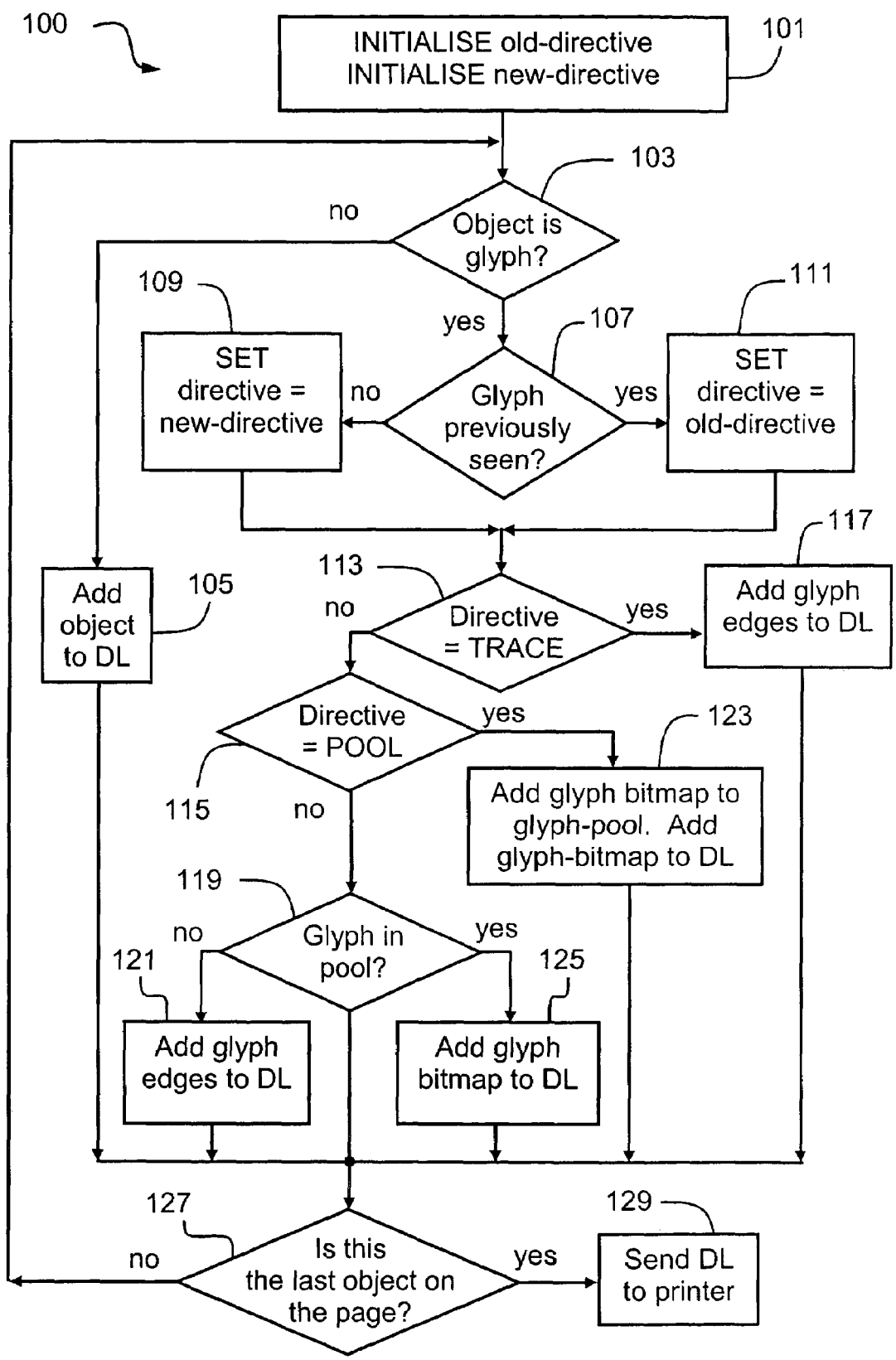
FIG. 1 is a flow diagram showing a process for generating a display list.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section relating to prior art arrangements relate to discussions of documents or devices which form public knowledge through their respective publication and/or use. Such should not be interpreted as a representation by the present inventor(s) or patent applicant that such documents or devices in any way form part of the common general knowledge in the art.

Some page description languages represent glyphs as bitmap primitives. Representing glyphs as bitmap primitives can significantly decrease the size of a display list in a printer. Such glyphs typically have a bit depth of one bit-per-pixel. To represent a bitmap primitive in such a page description language, the following information is required:

(i) Two edges describing the outline of the primitive;
  (ii) Bitmap data;
  (iii) A bitmap record, consisting of rendering information, such as an image-to-page transformation matrix, which maps the bitmap pixels to the page, the width and height of the bitmap data in pixel units, bit depth of the bitmap data and a pointer to the bitmap data in an area of memory in which a corresponding display list is stored; and
  (iv) A raster operation, which tells the raster image processor how to combine bitmap pixels with destination pixels.

Figure 2A:
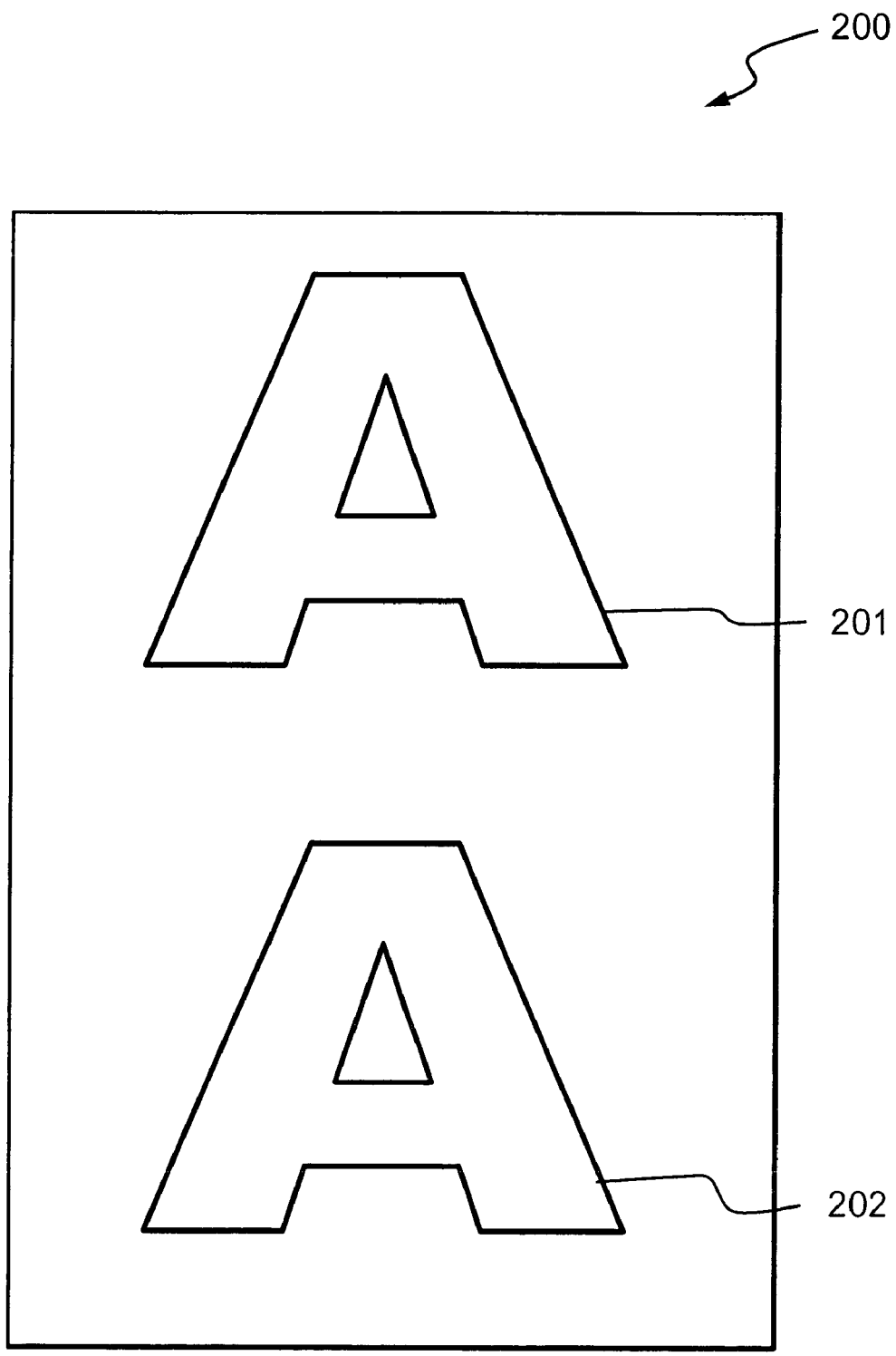
FIG. 2a shows a page comprising two characters using the same glyph 'A'.
Figure 2B:
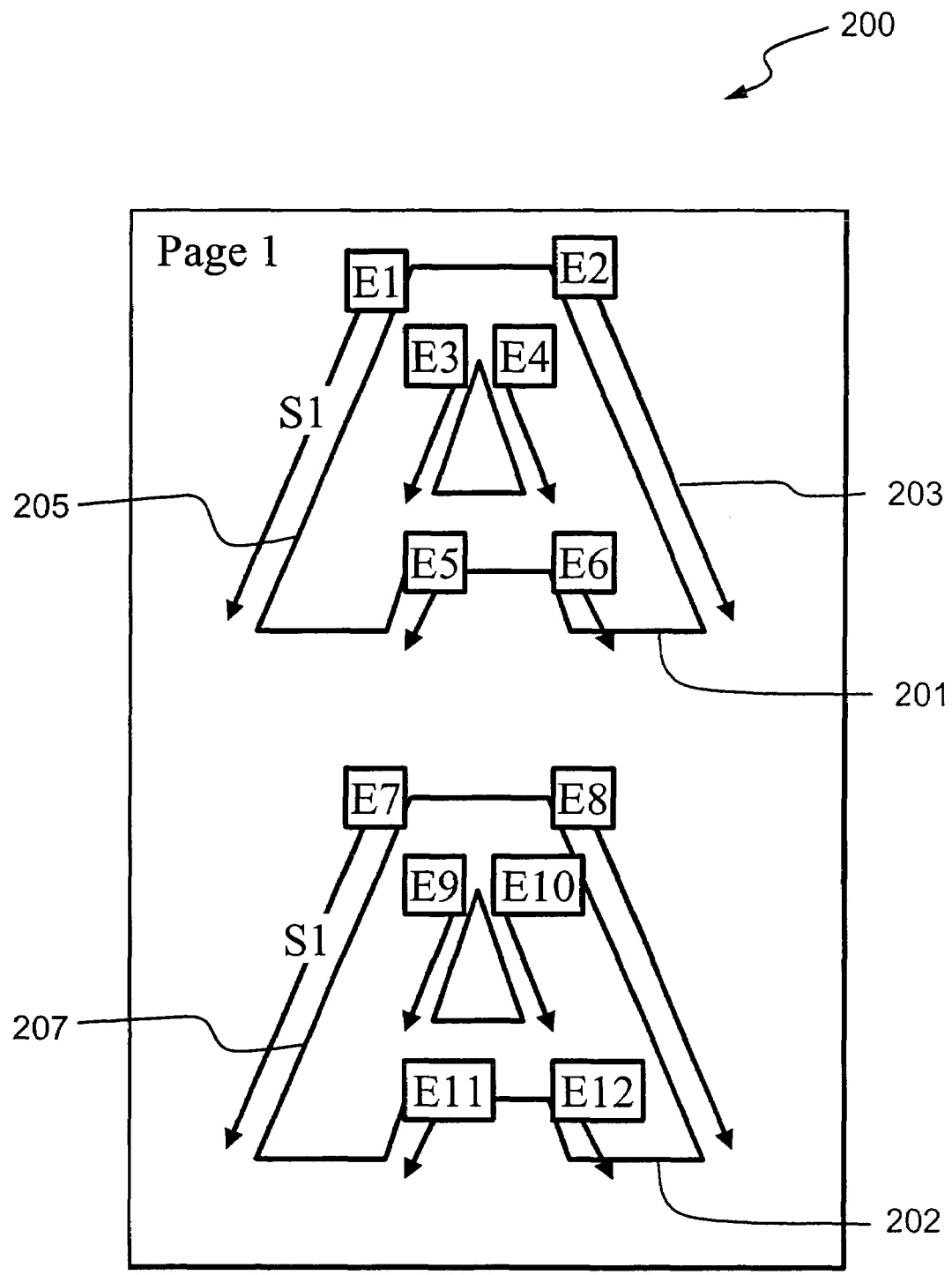
Figure 2C:
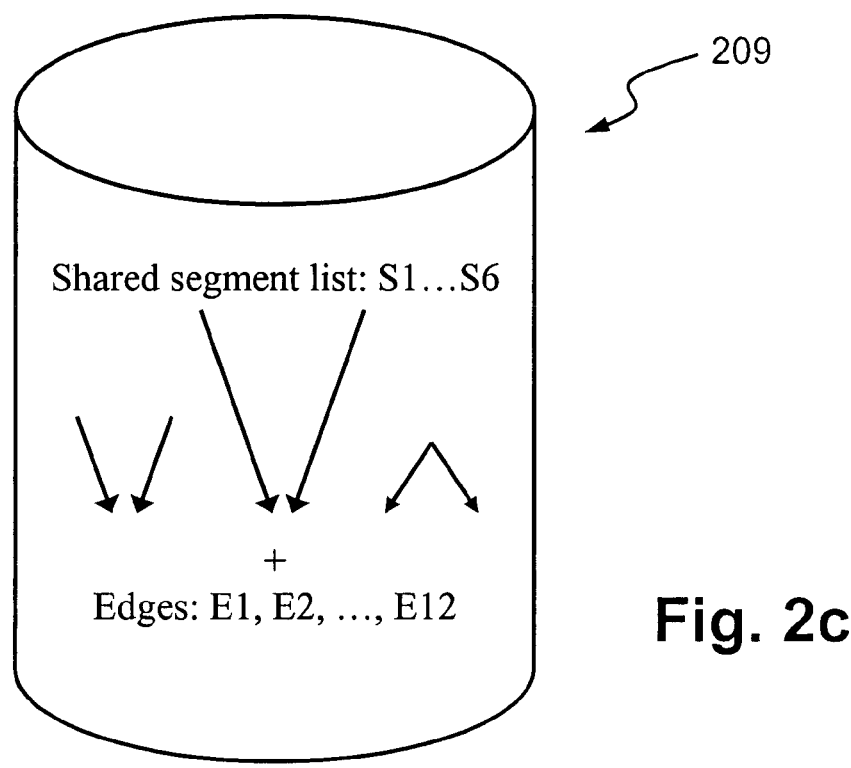
Figure 3:
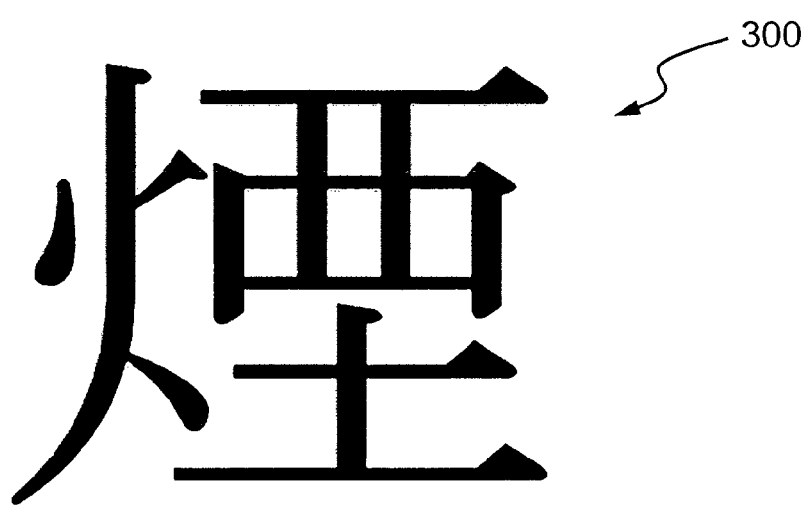
FIG. 3 shows a glyph of a complex font.
Figure 4A:
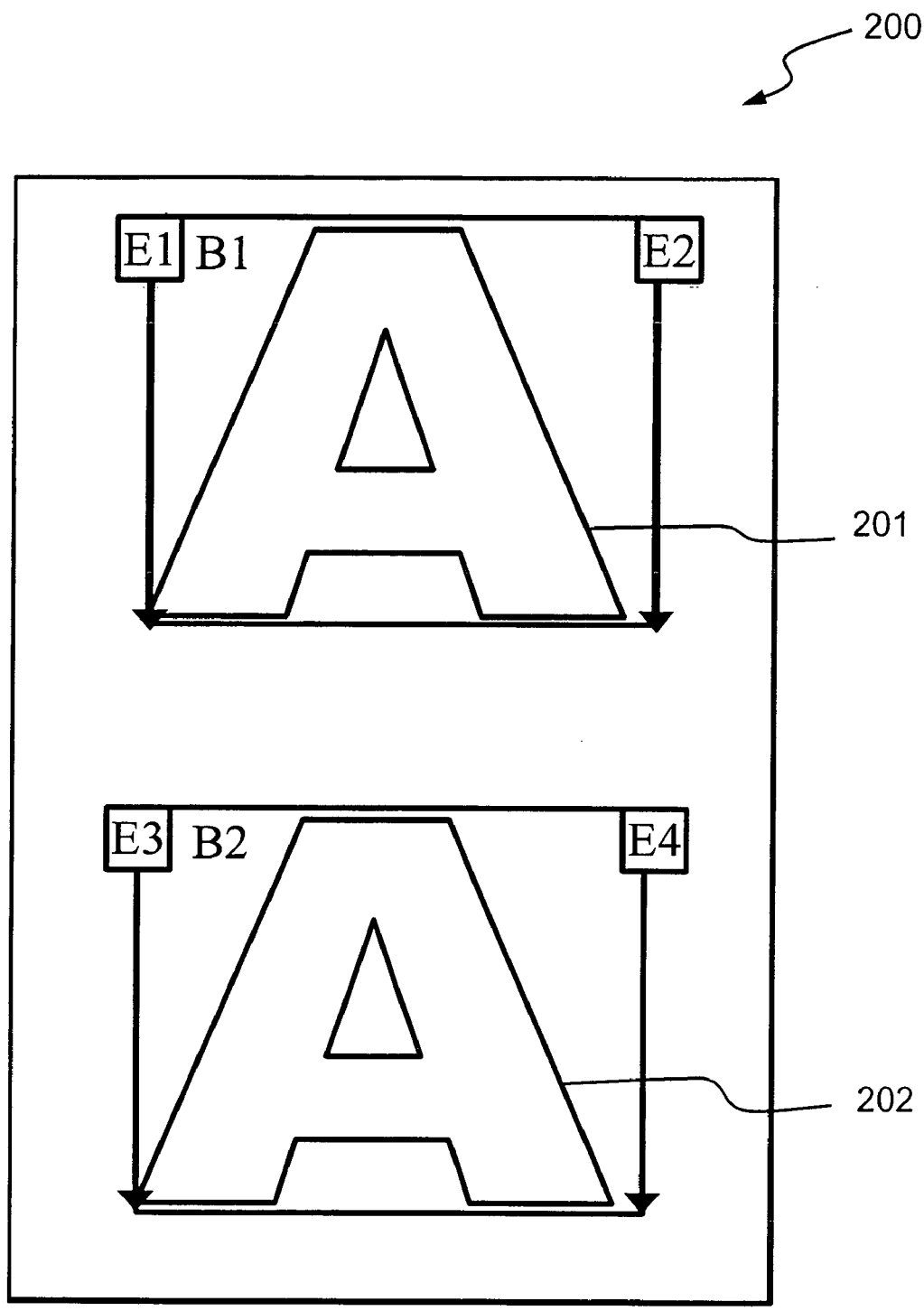
FIG. 4a shows edge records and bitmap records for the page of FIG. 2a, where the characters are represented as bitmap primitives.
Figure 4B:
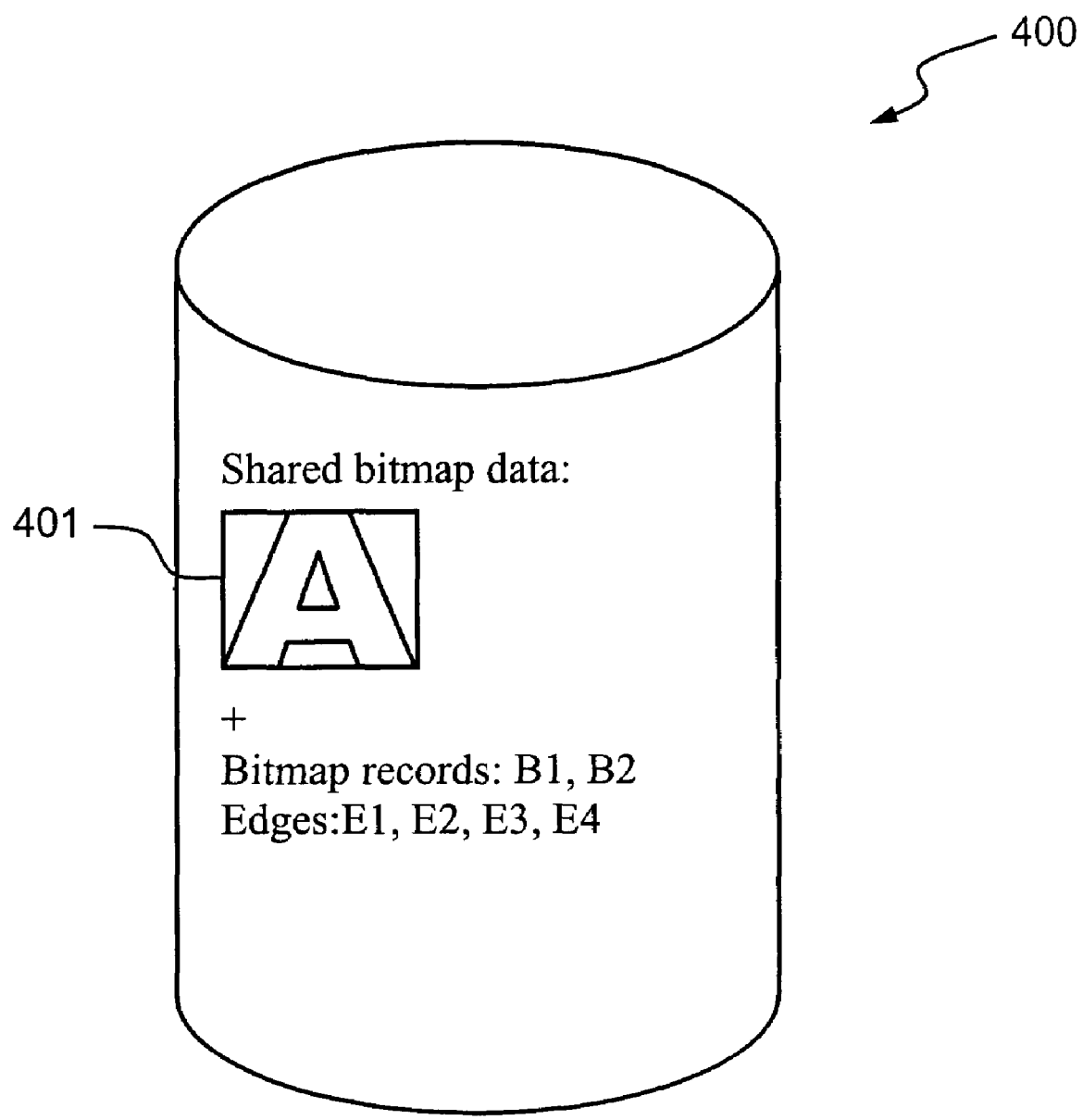

FIG. 4a shows edge records E1, E2 and bitmap records B1, B2 for the page 200 of FIG. 2a, where the characters 201 and 202 are represented as bitmap primitives. FIG. 4b represents a display list 400 for the page 200 of FIG. 4a. The display list 400 contains two bitmap primitives and shared bitmap data 401, where each primitive comprises two edge records (e.g., E1 and E2) and a bitmap record (e.g. B1). The bitmap data 401 for the characters 201, 202 is shared between the bitmap records B1 and B2.

A bitmap record cannot be shared, since the bitmap record locates a bitmap primitive on a page to be rendered in absolute device coordinates. However, like segment data, bitmap data may be shared over a page and also over multiple pages.

For example, if a bitmap record is represented by twelve (12) bytes of data, and total bitmap data for the above example page of five thousand (5000) kanji characters is eight hundred and forty (840) kilobytes, then the first page may require nine hundred and eighty six (986) kilobytes of data to be represented, if each of the glyphs on the page is represented as bitmap primitives. Since glyph bitmap data may be shared across pages, total spool size for one hundred (100) such pages is only fifteen (15) megabytes, which is a significant decrease in spool size from one hundred (100) megabytes plus segment data, as described for the example described in the Background section of the specification.

When using a bitmap primitive to render a glyph, compositing is required to ensure that only a glyph component of the bitmap primitive is rendered without obscuring the pixels beneath a non-glyph component of the bitmap primitive. For a black glyph, a known binary raster operation referred to as "MASKPEN" is suitable for use when the glyph component in a bitmap primitive is zero (i.e., black) and the non-glyph component is one (i.e., white). However, compositing is typically an expensive operation, even where rendering is performed by an Application Specific Integrated Circuit (ASIC), since for a binary raster operation, for each pixel of a bitmap, a renderer must fetch a source color and a destination color, apply an associated raster operation and write the result back to the destination. For a ternary raster operation, the process is even more complicated. Rendering a glyph as a bitmap primitive is therefore much slower than rendering the same glyph as a vector graphics primitive. As a result, for a printer using an edge rendering raster image processor, the time to render a page of five thousand composited one bit-per-pixel bitmap primitives may be several times slower than rendering a similar page of edges.

A process 100 (see FIG. 1) for generating a display list is described below with reference to FIGS. 1 to 18. The process 100 is particularly advantageous for rendering glyphs. The process 100 optimises the sharing of glyph data and accounts for various limitations of a display list and any downstream rendering system such as those discussed above. As will be explained in more detail below, the process 100 may be executed without any knowledge of or special memory reserve for font or glyph data.

Figure 17:
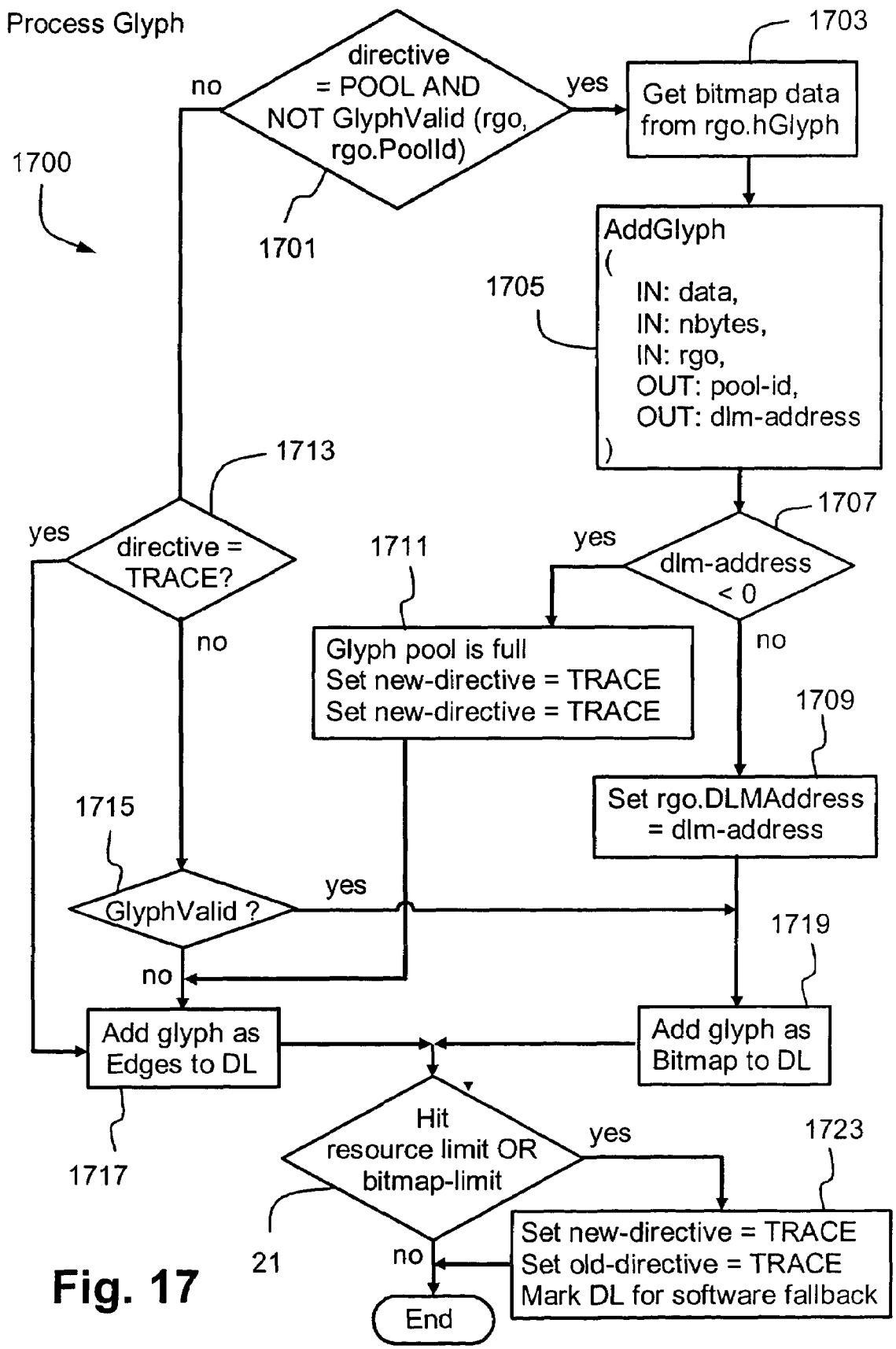
FIG. 17 is a flow diagram showing a process for processing a glyph.
Figure 18:
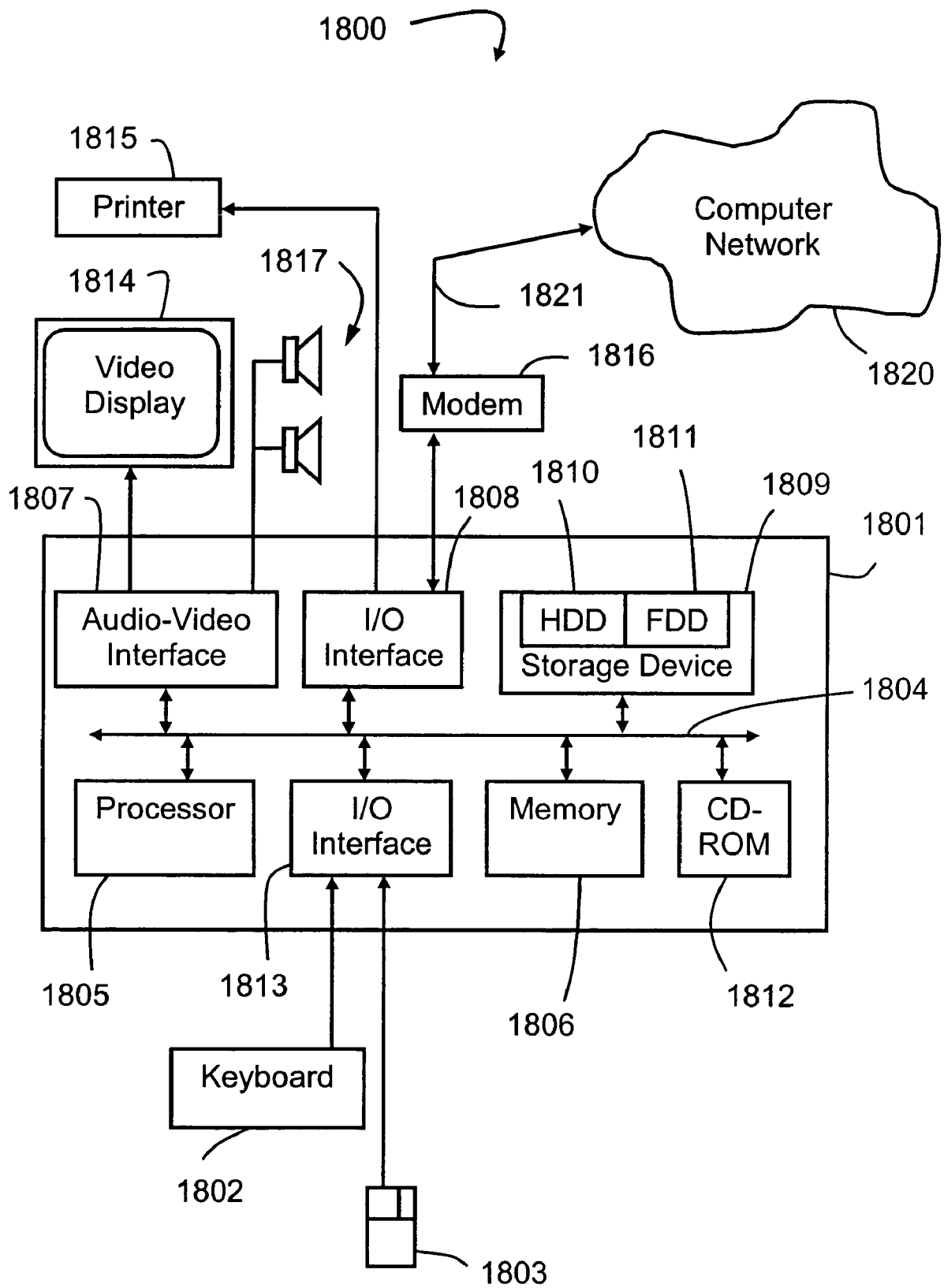
FIG. 18 shows a schematic block diagram of a general-purpose computer upon which arrangements described may be practiced.

The process 100 may be practiced using a general-purpose computer system 1800, such as that shown in FIG. 18 wherein the processes of FIGS. 1 to 17 may be implemented as software, such as an application program executing within the computer system 1800. In particular, the steps of the process 100 may be effected by instructions in the software that are carried out by the computer system 1800. The instructions may be formed as one or more code modules, each for performing one or more particular tasks. The software may also be divided into two separate parts, in which a first part performs the process 100 and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer effects an advantageous apparatus for implementing the process 100.

The computer system 1800 is formed by a computer module 1801, input devices such as a keyboard 1802 and mouse 1803, output devices including a printer 1815, a display device 1814 and loudspeakers 1817. A Modulator-Demodulator (Modem) transceiver device 1816 is used by the computer module 1801 for communicating to and from a communications network 1820, for example connectable via a telephone line 1821 or other functional medium. The modem 1816 may be used to obtain access to the Internet, and other network systems, such as a Local Area Network (LAN) or a Wide Area Network (WAN), and may be incorporated into the computer module 1801 in some implementations.

The computer module 1801 typically includes at least one processor unit 1805, and a memory unit 1806, for example formed from semiconductor random access memory (RAM) and read only memory (ROM). The module 1801 also includes an number of input/output (I/O) interfaces including an audio-video interface 1807 that couples to the video display 1814 and loudspeakers 1817, an I/O interface 1813 for the keyboard 1802 and mouse 1803 and optionally a joystick (not illustrated), and an interface 1808 for the modem 1816 and printer 1815. In some implementations, the modem 18116 may be incorporated within the computer module 1801, for example within the interface 1808. A storage device 1809 is provided and typically includes a hard disk drive 1810 and a floppy disk drive 1811. A magnetic tape drive (not illustrated) may also be used. A CD-ROM drive 1812 is typically provided as a non-volatile source of data. The components 1805 to 1813 of the computer module 1801, typically communicate via an interconnected bus 1804 and in a manner which results in a conventional mode of operation of the computer system 1800 known to those in the relevant art. Examples of computers on which the described arrangements may be practised include IBM-PC's and compatibles, Sun Sparcstations or alike computer systems evolved therefrom.

Typically, the application program is resident on the hard disk drive 1810 and read and controlled in its execution by the processor 1805. Intermediate storage of the program and any data fetched from the network 1820 may be accomplished using the semiconductor memory 1806, possibly in concert with the hard disk drive 1810. In some instances, the application program may be supplied to the user encoded on a CD-ROM or floppy disk and read via the corresponding drive 1812 or 1811, or alternatively may be read by the user from the network 1820 via the modem device 1816. Still further, the software may also be loaded into the computer system 1800 from other computer readable media. The term "computer readable medium" as used herein refers to any storage or transmission medium that participates in providing instructions and/or data to the computer system 1800 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 1801. Examples of transmission media include radio or infra-red transmission channels as well as a network connection to another computer or networked device, and the Internet or Intranets including e-mail transmissions and information recorded on Websites and the like.

The process 100 may alternatively be implemented in dedicated hardware such as one or more integrated circuits (e.g., an ASIC) performing the functions or sub functions of the process 1800. Such dedicated hardware may include graphic processors, digital signal processors, or one or more microprocessors and associated memories.

Before proceeding with a more detailed description of the process 100, a brief review of terminology used herein will now be discussed.

A command to draw a string of glyphs, as provided by a graphics device interface layer of the operating system of the computer system 1800, for example, generally consists of the following parameters:

(i) a font handle: an integer value which uniquely identifies a particular font from other fonts on the computer system 1800;

(ii) a string: a string consists of glyph handles which identify glyphs to draw at specified locations on a page to be rendered;

(iii) a fill: a fill describes how to colour a string of glyphs and may be any flat colour, pattern or blend; and (iv) a raster operation: a raster operation describes how to combine pixels of a rasterised string with pixels beneath the string.

On request, the graphics device interface layer enumerates the glyph handles in a "glyph string data structure", in conjunction with a font handle, and returns an array of "enumerated glyph objects". An enumerated glyph object comprises at least a glyph handle and access to either bitmap data or edge data for a glyph.

Generally, the graphics device interface layer of an operating system may enumerate glyphs as either bitmap primitives or vector graphics primitives. Where a graphics device interface layer is capable of enumerating glyphs in only one format, then a vector graphics primitive may be generated from a bitmap primitive using any known bitmap tracing algorithm, or conversely a bitmap primitive may be generated from a vector graphics primitive using any known scanline conversion algorithm.

When an enumerated glyph object is processed for the first time, a private glyph data structure referred to as a "realized glyph object" is created. A realized glyph object contains information required to add more instances of a particular glyph to a display list configured within memory 1806 as efficiently as possible. A realized glyph object may consist of at least the following members:

(i) a unique glyph handle;

(ii) an associated unique font handle;

(iii) information about adding a glyph as a bitmap primitive to the display list; and (iv) information about adding a glyph as a vector graphics primitive to the display list.

Once created, a realized glyph object is added to a "private glyph cache" configured within memory 1806, which may be in the form of a hash table. The private glyph cache allows fast retrieval of a realized glyph object given unique font and glyph handles. The realized glyph object stores data that is independent of the location of a particular instance of a glyph on the page.

A "new glyph" refers to an enumerated glyph object that does not have a matching realized glyph object in the private glyph cache.

An "old glyph" refers to an enumerated glyph object that has a matching realized glyph object in the private glyph cache. A realized glyph object may store either bitmap data describing the glyph, or edge data describing the glyph, or both.

A "candidate string" is a string of glyphs with certain predetermined criteria that mean rendering the glyphs as bitmap primitives is preferable to rendering the glyphs as edges. For example, one or more criteria for being a candidate string may be the following:

(i) Associated fill is flat black and an associated raster operation is COPYPEN, as known in the relevant art, indicating that one bit-per-pixel glyphs may be rendered as bitmap primitives using a MASKPEN raster operation, as known in the relevant art;

(ii) An associated font is an Asian character set indicating that glyphs will most likely require many edges to describe the outline;

(iii) An average glyph bitmap primitive size is less than some predetermined number of bytes. Bitmap primitives larger than a certain size are more efficiently stored and rendered as edges.

Criterion (i) above is useful if a raster image processor of the printer 1815 only supports binary raster operations. In this instance, it is preferable to only output as bitmap primitives black text when the raster operation is a COPYPEN operation. Black is the most commonly used colour when printing text, as is COPYPEN the most commonly used raster operation.

Criterion (iii) above ensures that large glyphs are not rendered as bitmap primitives. The larger a glyph, the more processing is required to composite an equivalent bitmap primitive. An average glyph size may be determined from the size of a bounding rectangle of a string and a number of glyphs in the string. For example, in one implementation the maximum average bitmap size may be in the order of eleven hundred (1100) bytes.

In one implementation, the glyphs of a string not deemed a candidate are output as edges. As referred to hereinafter, the term glyphs refers to candidate glyphs.

Figure 5:
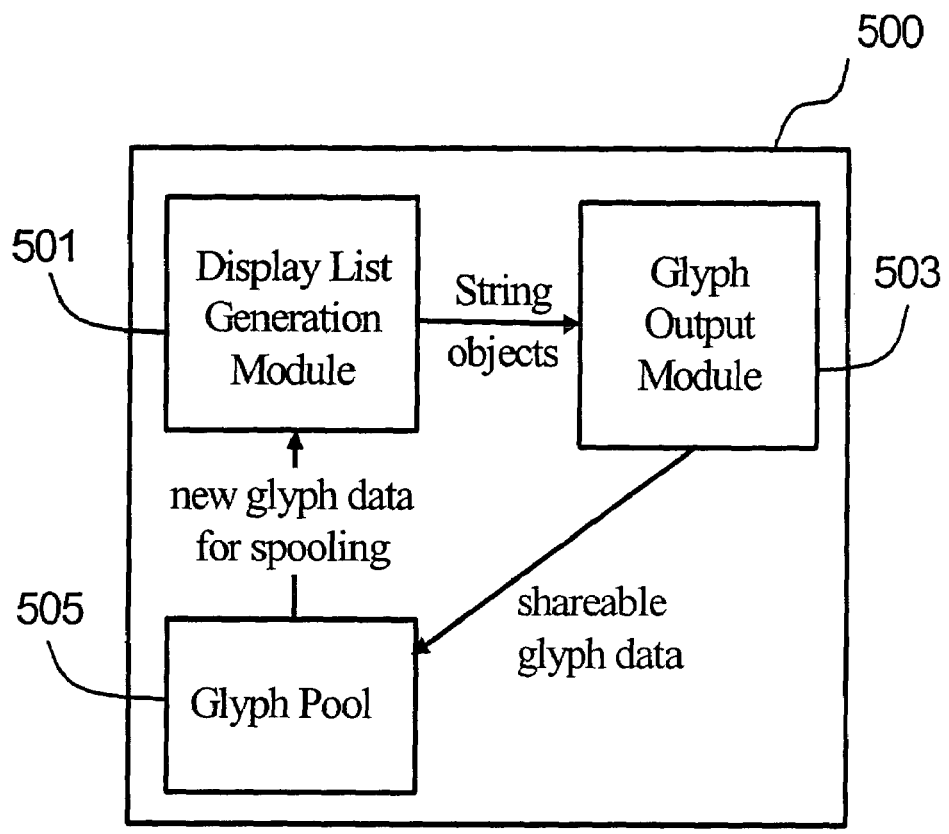
FIG. 5 shows a printer driver software module.

The process 100 is preferably implemented as one or more software modules of a printer driver software module 500, as seen in FIG. 5, which is resident on the hard disk drive 1810 of the computer module 1801 and is controlled in its execution by the processor 1805. The printer driver module 500 comprises a display list generation module 501, a glyph output module 503 and a glyph pool 505.

The display list generation module 501 is responsible for building a display list within memory 1806 for a page to be rendered. The display list generation module 501 receives graphics objects representing glyphs from the graphics device interface layer of the operating system executing on the computer module 1801 and adds the glyphs to a display list configured within memory 1806 in a format conforming to a page description language as understood by the printer 1815. When the display list generation module 501 receives a glyph, the display list generation module 501 passes the glyph to the glyph output module 503.

The glyph output module 503 is responsible for processing a glyph or string of glyphs received from the display list generation module 501. The glyph output module 503 loads the display list with a mix of glyphs represented as both vector graphics primitives and bitmap primitives in a manner that minimizes the size of the display list configured within memory 1806 without impacting on rendering speed of the printer 1815. The glyph output module 503 adds a predetermined number of glyphs to the display list as bitmap primitives, and switches to adding glyphs as vector graphics primitives when any number of events occur while the display list is being generated. Shareable glyph data is passed from the glyph output module 503 for storage in the glyph pool 505, as seen in FIG. 5.

The glyph pool 505 manages a shared pool of glyph data. The glyph pool 505 mirrors glyph data stored in reserved memory of a display list memory arena 600 (see FIG. 6) of the printer 1815. The glyph pool 505 remembers which glyphs to be rendered have had associated bitmap data sent to the printer 1815 and which have not. Once the display list is generated within memory 1806 of the computer module 1801, the glyph pool 505 supplies the display list generation module 501 with new glyph data, which is the shareable glyph data that was added to the glyph pool during the generation of the display list.

The glyph pool 505 accepts shareable glyph data up to a maximum predetermined number of bytes. The predetermined number of bytes may be a small fraction of the total size of the display list memory arena 600. For example, for a thirty two (32) megabyte display list memory arena 600, a shareable glyph pool in the order of one (1) megabyte is adequate. The predetermined number of bytes may be determined by considering a maximum percentage of a page to be rendered which may be covered by unique bitmap primitives requiring compositing, such that the percentage does not affect the overall rendering speed of a raster image processor of the printer 1815. In one implementation, no more than one third of a page to be rendered is covered with one bit-per-pixel bitmap primitives requiring compositing. At six hundred dots per inch (i.e, 600 dpi), one third of an A4 page to be rendered corresponds to:

33% of (6000 pixels*4500 scanlines * 1 bit-per-pixel/8 bits-per-byte)=1.06 MB~1 MB.

The display list generation module 501 controls two directives referred to as a "new-directive" and an "old-directive". The new-directive and old-directive are high-level variables in the display list generation module 501 that indicate how a glyph is to be added to the display list configured within memory 1806.

The new-directive is read by the glyph output module 503 to determine how to process previously unseen glyphs (i.e., glyphs that have not been previously received from the graphics device interface layer for a display list currently being generated). The old-directive is read by the glyph output module 503 to determine how to process previously seen glyphs (i.e., glyphs that have been previously received from the graphics device interface layer for the display list currently being built).

Values for the new-directive include "POOL" and "TRACE", whilst values for the old-directive include "POOL", "TRACE", and "DEFAULT". The value POOL indicates that a bitmap data representation of a glyph to be rendered is to be added to a display list configured within memory 1806 by the display list generation module 501. The bitmap data is output by the glyph output module 503 and is added to the glyph pool 505. The value TRACE indicates that a vector representation of the glyph to be rendered is to be added to the display list configured within memory 1806. The value DEFAULT indicates that a bitmap representation of the glyph to be rendered is to be added to the display list if the bitmap data is already in the glyph pool 505, otherwise a vector representation of the glyph is be added to the display list configured within memory 1806.

As will be described in more detail below, during the process of generating a display list within memory 1806, a number of events may occur that affect the manner in which glyphs are processed. Depending on an event the new-directive and old-directive variables are set. For example, if at the start of a page to be rendered, the glyph pool 505 is not full, then the new-directive is set to POOL and the old-directive is set to POOL.

As another example, if a display list resource limit is reached, the new-directive is set to TRACE and the old-directive is set to TRACE. Similarly, if the glyph pool 505 reaches the predetermined maximum size, then the new-directive is set to TRACE and the old-directive is set to DEFAULT. Further, if a maximum number of bitmap glyphs have been added to the display list configured within memory 1806, then the new-directive is set to TRACE and the old-directive is set to TRACE. Still further, if at the end of a page to be rendered the size of the display list for the page is larger than available display list memory in the printer 1815, then a software fallback display list is generated and only the data in the software fallback display list is sent to the printer 1815 for rendering. Any new glyph data that was added to the glyph pool 505 for the page is discarded.

The process 100 of generating a display list will now be explained with reference to FIG. 1. The process 100 is preferably implemented as a portion of the software code, which forms the printer driver 500. The process 100 begins at step 101, where the printer driver 500 receives a command from the graphics device interface layer to start forming a display list for a page to be rendered. At step 101 the processor 1805 controlling the execution of the printer driver 500 initializes the old-directive and the new-directive variables. Then at the next step 103, if a first graphical object of the page to be rendered is a glyph, then the process 100 proceeds to step 107. Otherwise, the process 100 proceeds to step 105 where the graphical object is added to a display list created in memory 1806 by the processor 1805. Following step 105, the process 100 proceeds to step 127.

At step 107, if the glyph received by the printer driver 500 has already been seen (i.e., the glyph has been previously received from the graphics device interface layer for the display list currently being generated), then the process 100 proceeds to step 111. Otherwise, the process 100 proceeds to step 109. At step 111 the processor 1805 sets a variable "directive" configured within memory 1806 to the value of the old-directive. In contrast at step 109, the processor 1805 sets the variable directive to the value of the new-directive. Then at the next step 113, if the processor 1805 determines that the variable directive is equal to TRACE, then the process 100 proceeds to step 117. Otherwise, the process 100 proceeds to step 115. At step 117 the glyph is added to the display list configured within memory 1806 as edge records. Following step 117, the process 100 proceeds to step 127.

At step 115 if the processor 1805 determines that the variable directive is equal to POOL, then the process 100 proceeds to step 123. Otherwise, the process 100 proceeds to step 119. At step 123, a bitmap primitive corresponding to the glyph is added to the display list and corresponding bitmap data to the glyph pool 505. Following step 123, the process 100 proceeds to step 127.

At step 119, if the processor 1805 determines that the bitmap data representing the glyph is already in the glyph pool 505, then the process 100 proceeds to step 125. Otherwise, the process 100 proceeds to step 121. At step 125, the bitmap primitive representing the glyph is added to the display list configured within memory 1806. At step 121, edge records representing the glyph are added to the display list.

At step 127, if the processor 1805 determines that there are any further objects of the page to be rendered then the process 100 returns to step 103. Otherwise the process 100 proceeds to step 129 where the display list configured within memory 1806 and containing the data representing the page to be rendered is sent to the printer 1815. The process 100 concludes following step 129.

The process 100 of generating a display list will now be explained in more detail below.

Figure 6:
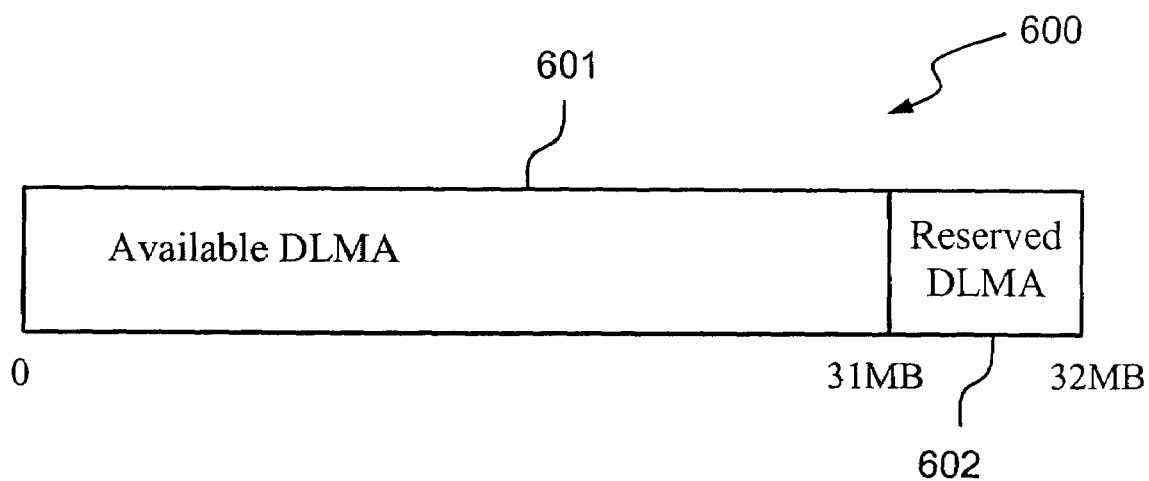
FIG. 6 shows a display list memory arena.

FIG. 6 shows the display list memory arena 600 of the printer 1815. The display list memory arena 600 is configured within memory of the printer 1815. As seen in FIG. 6, a first thirty-one (31) megabytes 601 of the display list memory arena 600 is referred to as "available display list memory arena" (available DLMA). The last one (1) megabyte 602 is referred to as "reserved display list memory arena" (reserved DLMA).

The glyph pool 505 maintains a data buffer of shareable glyph data, which is initially empty. The data buffer is configured within memory 1806. When bitmap data is added to the glyph pool 505, the bitmap data is appended to the end of the data buffer. The data buffer mirrors the contents of the reserved display list memory arena 602.

The glyph pool 505 maintains two locations in the data buffer as follows:

(i) a "next-byte" refers to a next available byte in the data buffer into which glyph data may be added;

(ii) a "last-commit-point" is a location in the data buffer where all data up to but not including a particular byte has been downloaded to the reserved display list memory arena 602 of the printer 1815. All glyph data up to the last-commit point is available in the printer 1815.

When new glyph data is spooled to the reserved display list memory arena 602, the display list generation module 501 requests the glyph pool 505 to commit all data. The glyph pool 505 then sets the last commit point to the value of a next byte.

As will be described in more detail below, on request, the glyph pool 505 may also discard any new data. Such a discarding process is referred to herein as "rollback", where the glyph pool 505 sets a next byte to the value of the last commit point.

The glyph pool 505 may share both segment and bitmap data.

As described above, a directive (e.g., the new-directive and the old-directive) is a high-level variable in the display list generation module 501 that indicates how a glyph is to be added to the display list configured within memory 1806. The value of the directive determines whether to add the glyph as a bitmap primitive or as a vector graphics primitive.

A directive may specify one of three values as follows:

(i) POOL: The value POOL directs the glyph output module 503 to add a glyph to the display list configured within memory 1806 as a bitmap primitive. The bitmap data is added to the glyph pool 505, if the bitmap data is not already in the glyph pool 505, and the bitmap primitive, consisting of two edges and a bitmap record, is added to the display list. The bitmap record contains a field referred to as "image-address" which is set to the address in the display list of the bitmap data representing a particular glyph;

(iii) TRACE. The value TRACE directs the glyph output module 503 to determine the edges of a glyph, store corresponding segment lists as a realized glyph object, and output an edge representation of the glyph to a display list configured within memory 1806.

(iv) DEFAULT. The value default directs the glyph output module 503 to add a glyph as a bitmap primitive to a display list configured within memory 1806, if the bitmap data is already in the glyph pool 505, otherwise to output an edge representation of the glyph to the display list.

As described above, two directives may be utilized. The new-directive guides the glyph output module 503 when processing new glyphs and the old-directive guides the glyph output module 503 when processing old glyphs. As also described above, values for the new-directive are POOL and TRACE, where the initial state is POOL. Further, values for the old-directive are POOL, TRACE, and DEFAULT, where the initial state is POOL.

When the size of a display list configured within memory 1806 exceeds the size of the available display list memory arena 601 of the printer 1815 or the display list exceeds other rendering limits and so cannot be rendered by the printer 1815, the display list may be rendered in software, by the printer driver 500. In this instance, a fallback display list is generated, consisting of a single image of a page to be rendered. The fallback display list is configured for rendering by the raster image processor of the printer 1815. The generation of the fallback display list is referred to as "software fallback."

There are four limits that are considered during display list generation and glyph string processing as follows:

(i) Glyph pool limit: indicates the size of the reserved display list memory arena 602. The glyph pool limit is reached when the glyph output module 503 tries to unsuccessfully add bitmap data to the glyph pool 505.

(ii) Maximum bitmap limit: indicates the maximum number of bitmap primitives to be added to a display list. The maximum bitmap limit may be determined empirically by measuring the effect that compositing various numbers of bitmap primitives onto the page has on render speed of the printer 1815. In one implementation, a maximum bitmap limit in the order of one thousand and twenty four glyphs of average size eleven hundred bytes may be used.

(iii) Display list resource limit: A display list resource limit is a limitation of a page description language associated with the printer 1815. In the case of the page description language, the graphics device interface layer may request a graphics primitive to be drawn that is not supported by the page description language. The raster image processor of the printer 1815 may also have an upper limit on the number of graphics objects that may be rendered. For example, the raster image processor may not be able to process a display list containing more than the number of glyphs represented by the display list resource limit. The display list resource limit may occur during both text processing and non-text processing.

(iv) Display list size limit. The value of the display list size limit is less than or equal to the size of the available display list memory arena 601. The display list size limit is considered after glyphs have been added to the display list.

When a display list can not be rendered by the raster image processor of the printer 1815, then a software fallback display list may be generated by the printer driver 500, as described above.

There is a difference between drawing a string of glyphs using bitmap primitives and using vector graphics primitives. When a bitmap primitive is added to a display list configured within memory 1806, each bitmap primitive is considered as separate graphics object. That is, a bitmap primitive is represented in the page description language of the printer 1815 by two vertical edges, describing the bounds of the primitive on the page to be rendered; the object properties of the primitive, describing the priority, opacity requirements, raster operation to use, type of fill; and the fill, which is in such a case is the bitmap record and bitmap data describing the shape of the glyph.

When glyphs are added as vector graphics primitives, then only one graphics object is required. That is, an edge-based string is represented in the page description language of the printer 1815 by edges describing all glyphs of the string; object properties of the string, describing the priority, opacity requirements, raster operation to use, type of fill; and the fill, which is in this instance represents the colour with which to fill the edges of the glyph.

Using the glyph pool limit, the maximum bitmap limit, the display list resource limit and the display list size limit described above, five key events that modify the new and old directives may be identified as follows:

(i) Glyph Pool Limit is Reached.

A "glyph pool limit is reached" event indicates that the glyph pool 505 has been filled. As a result, no more bitmap data may be added to the glyph pool 505, but any glyphs whose bitmap data is already in the glyph pool 505 may be added to a display list configured within memory 1806 as bitmap primitives. Glyphs, added to the glyph pool 505 before the "glyph pool limit is reached" event, are spooled to the printer 1815. For the remainder of a page to be rendered, new glyphs are output as edges, and old glyphs use an associated default realization. For the remaining pages of a document including the page, the new and old directives are set so that new glyphs are added as edges, and old glyphs use an associated default realization.

(ii) Maximum Bitmap Limit is Reached.

A "maximum bitmap limit is reached" event indicates that the maximum number of glyphs as bitmap primitives has been added to the display list for a current page to be rendered. Any further glyphs to be rendered are rendered as edges. New glyphs added to the glyph pool 505 before the event occurred are spooled to the printer 1815. For the remainder of the page to be rendered, new and old glyphs are added to the display list as edges (i.e., edge records). For remaining pages of the document, the new and old directives are set so that new and old glyphs are pooled if the glyph pool 505 is not full, otherwise new glyphs are added as edges (i.e., edge records), and old glyphs use an associated default realization.

(iv) Display List Resource Limits Reached During Text Processing.

(v) Display List Resource Limits Reached-During Non-Text Processing.

(vi) Display List Size Limit is Reached

For the events (iv), (v) and (vi) directly above, a software fallback display list is required once an entire display list has been generated in memory 1806. The software fallback display list has access to a complete set of data in the glyph pool 505, including any new glyph data that was added to the glyph pool 505 before the particular event occurred. Once the software fallback display list is generated, the software fallback display list may be spooled to the printer 1815 for rendering without the new glyph data that was added to the glyph pool 505 for a page being rendered. In this instance, a rollback is performed on the glyph pool 505 to discard glyphs added after the last commit point. Further, any new glyph data that was added to the glyph pool 505 is discarded once the software fallback display list has been generated. New glyph data is not spooled to the printer 1815 in order to minimise the amount of data spooled to a display list configured within memory of the printer 1815. Also, a software fallback display list does not access any glyph data. For the remainder of the page to be rendered, new and old glyphs are added as edges, since software rendering of bitmap primitives by a compositing means is more "processor intensive" than rendering the same glyph data as edges (i.e., edge records). For remaining pages of the document being rendered, the new and old directives are set so that new and old glyphs are pooled if the glyph pool 505 is not full, otherwise new glyphs are added as edges and old glyphs use associated default realizations.

Figure 7:
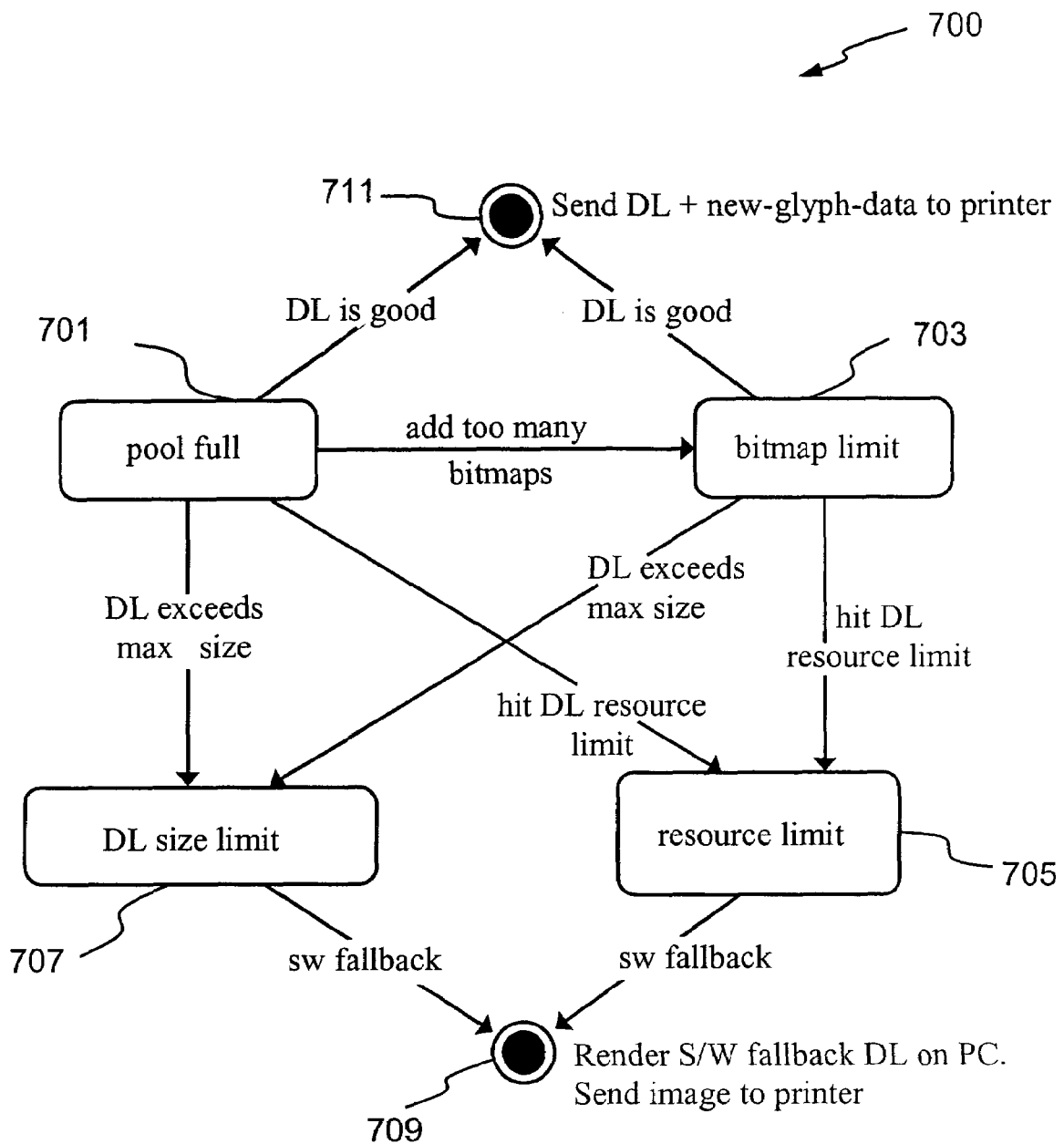
FIG. 7 shows a state diagram of events as the events may occur.

FIG. 7 shows a state diagram 700 of the above described events as the events may occur. As seen in FIG. 7, a pool-full event 701 may lead to a bitmap-limit event 703 since old glyphs may still be added to a current display list if the old glyphs are in the glyph pool 505. A pool-full event 701 may also lead to a display list size limit event 707, a resource limit event 705, or the pool-full event 701 may result in a good display list that may be spooled to the printer 1815 (i.e., as represented by the point 711 of the state diagram 700). A bitmap-limit event 703 may lead to a display list size limit event 707 or a resource limit event 705, but not a pool-full event 701. A bitmap-limit event 703 may also lead to a good display list that may be spooled to the printer 1815, as represented by the point 711 of the state diagram 700. A resource limit event 705 leads only to software fallback 709. A display list (DL) size limit event 707 also leads only to a software fallback display list being generated as represented by the point 709 of the state diagram 700.

FIG. 8 shows a table 801 summarising how the new-directive variable and the old-directive variable are set. The new-directive and old-directive are set based on events in the order that the events may possibly occur. The table 801 is described below in more detail below with reference to FIGS. 11 to 17.

Where no events occurred in generating a display list within memory 1806 which lead directly to a software fallback display list being generated, new glyph data lying between the last-commit-point and the next-byte may be downloaded to the reserved display list memory arena 602 of the printer 1815. The new glyph data is also committed in the glyph pool 505.

As explained above, where an event occurred that leads to a software fallback display list being generated, then once the software fallback display list is generated, any new glyph data after the last commit point is discarded. That is, the glyph pool 505 is rolled back to the last commit point.

Realized glyph objects in the glyph cache may be needed to determine if glyph data associated with a particular realized glyph object has been discarded from the glyph pool 505. In one implementation, the glyph pool 505 maintains a table of pointers called a "valid-glyph-list". Each entry in the valid-glyph-list corresponds to a unique realized glyph object, and each realized glyph object stores a corresponding unique entry in the valid-glyph-list, referred to as a "pool-id."

Figure 9A:
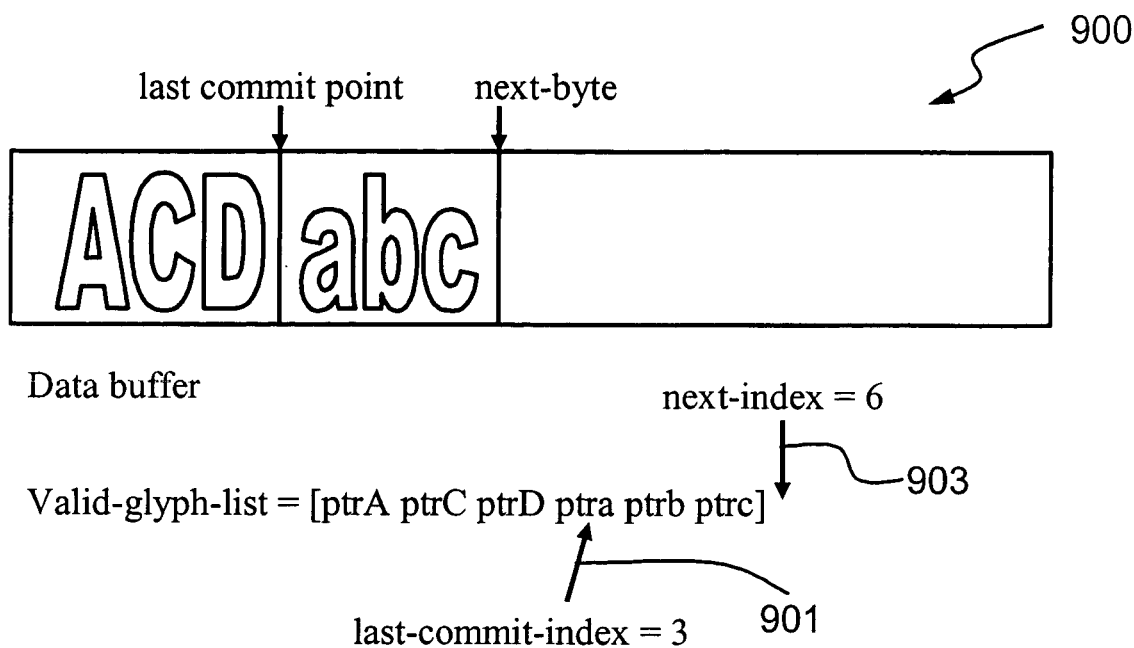
FIG. 9a shows a data buffer as maintained by a glyph pool of the printer driver of FIG. 5 in one example.
Figure 9B:
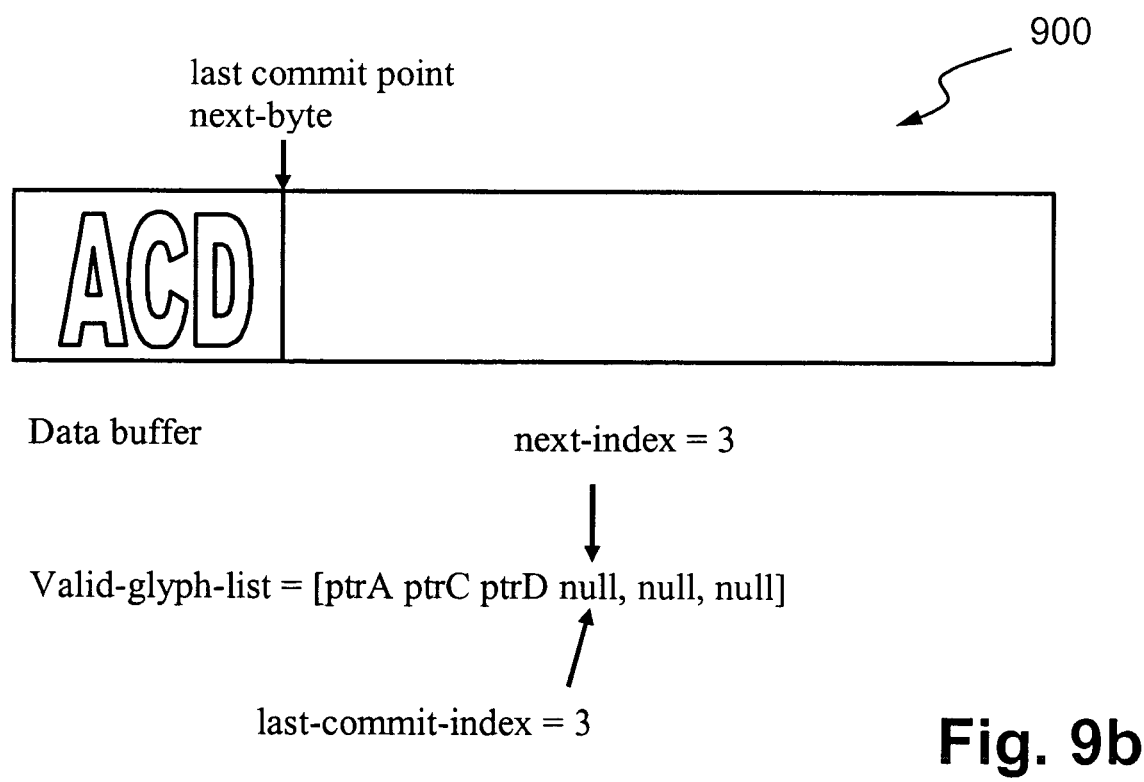
FIG. 9b shows a data buffer as maintained by the glyph pool of FIG. 5 after rollback.

FIG. 9a shows a data buffer 900 maintained by the glyph pool 505 in an example state, for a page to be rendered comprising a set of glyphs {A, C, D, a, b, c}. The data buffer 900 contains bitmap data for the set of glyphs {A, C, D, a, b, c}. In the example of FIG. 9a, the bitmap data for the glyphs A, C and D have been sent to the printer 1815. A valid glyph list corresponding to the buffer 900 of FIG. 9a contains an array of pointers to realized glyph objects as follows:

[ptrA ptrC ptrD ptra ptrb ptrc]

An associated last-commit-index corresponds to a next location after the glyph 'D' in the valid glyph list, as represented by the arrow 901 shown in FIG. 9a. An associated next-index indicates the next available location in the valid-glyph-list, as represented by the arrow 903 shown in FIG. 9a.

In the example of FIG. 9a, the pool-id for glyph 'b' is four (4). The value of the pool-id is stored in the realized glyph object, ptrb, in memory 1806.

Continuing the example, if a resource event occurs, the page is software rendered, and a rollback is performed. As a result, the buffer 900 of the glyph pool 505 is now in the state of FIG. 9b. The glyph data for glyphs 'a', 'b' and 'c' are discarded and all entries between the position indicated by the next-index and the position indicated by the last-commit-index in the valid-glyph-list are set to null.

Figure 9C:
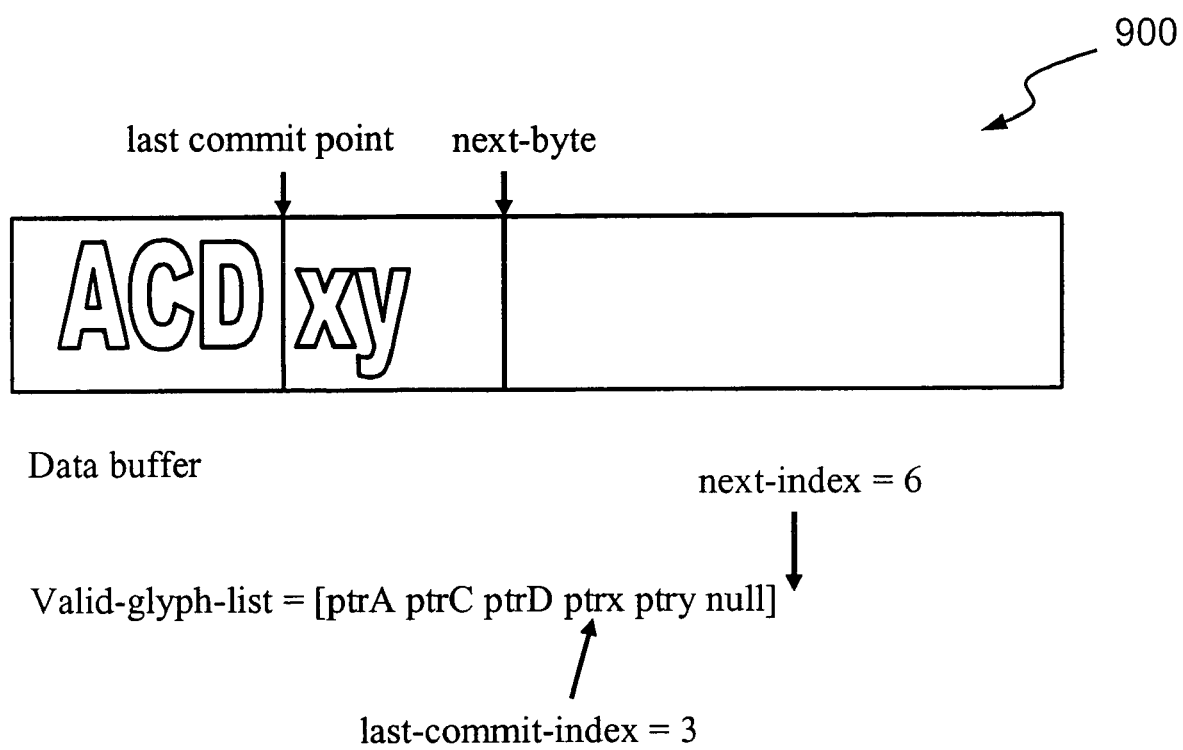
FIG. 9c shows a data buffer as maintained by the glyph pool of FIG. 5 after rollback followed by adding glyphs to the data buffer.

Then on a next page to be rendered, a string of glyphs "xyb" is processed. A new glyph 'x' is added to the buffer 900 and is assigned a ptrx pool-id=3, as shown in FIG. 9c. A new glyph 'y' is added to the buffer 900 and is assigned a ptry pool-id=4 as shown in FIG. 9c.

Continuing the example, the next glyph to process is a 'b' glyph. Ptrb is already in the glyph cache configured within memory 1806 and has a pool-id=4. The glyph output module 503 requests the glyph pool 505 to check the entry of the valid-glyph-list at the given pool-id, which as described above is equal to four (4). The valid-glyph-list entry is currently set to ptry, which is not equal to ptrb. Therefore the glyph data for ptrb is not in the glyph pool 505. The glyph data for 'b' is re-added to the glyph pool 505 and ptrb is assigned a new location in the valid glyph list, being pool-id=5.

In one implementation, the reserved display list memory arena 602 of the printer 1815 is assumed to be persistent, which means glyph data downloaded from previous pages is present in the display list memory arena 600 for the current page. As described herein, high-memory of the display list memory arena 600 is reserved for shared glyph data. However, any arbitrary partitioning of the display list memory arena 600 may be used.

Figure 10A:
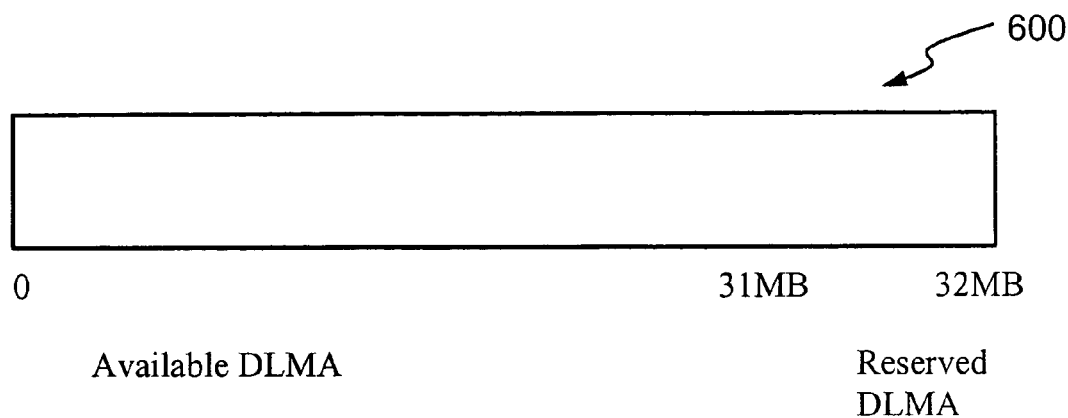
FIG. 10a shows a display list memory arena for a printer in a first state.
Figure 10B:
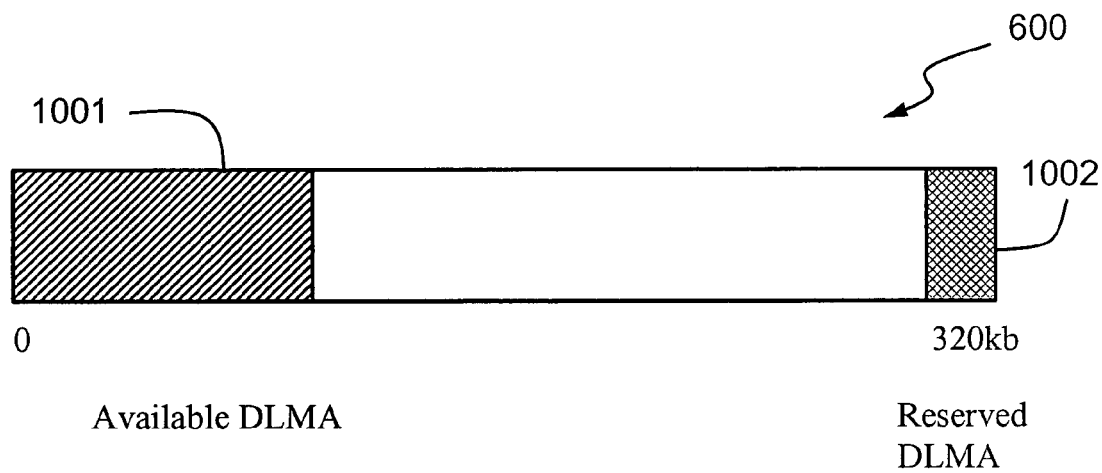
FIG. 10b shows the display list memory arena of FIG. 10a in a second state.
Figure 10C:
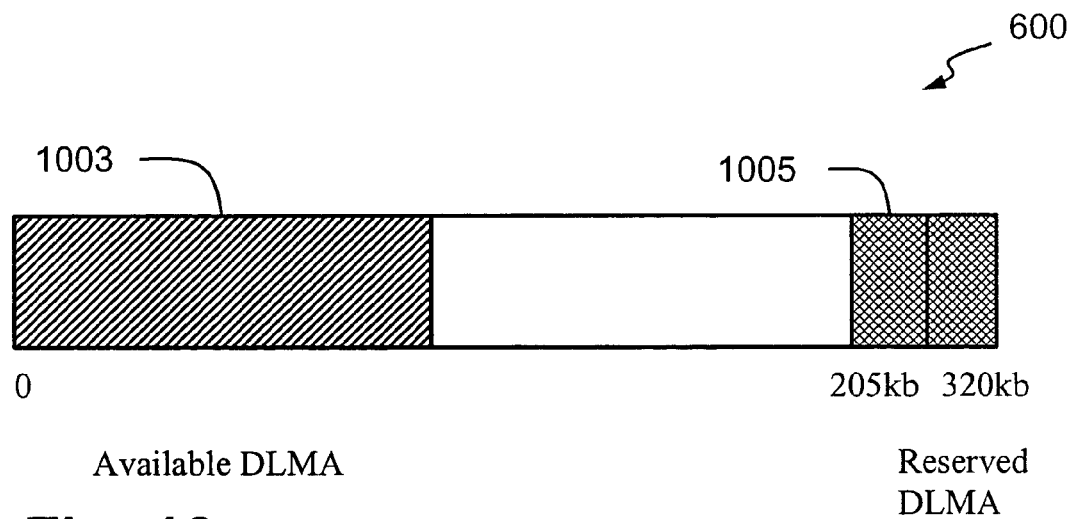
FIG. 10c shows the display list memory arena of FIG. 10a in a third state.
Figure 10D:
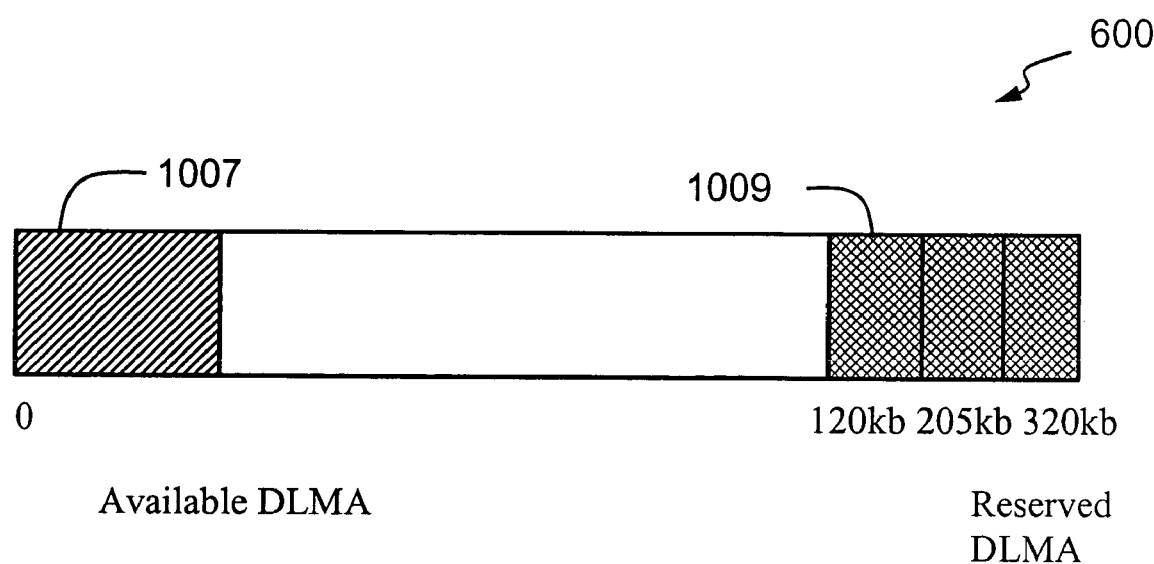
FIG. 10d shows the display list memory arena of FIG. 10a in a fourth state.
Figure 10E:
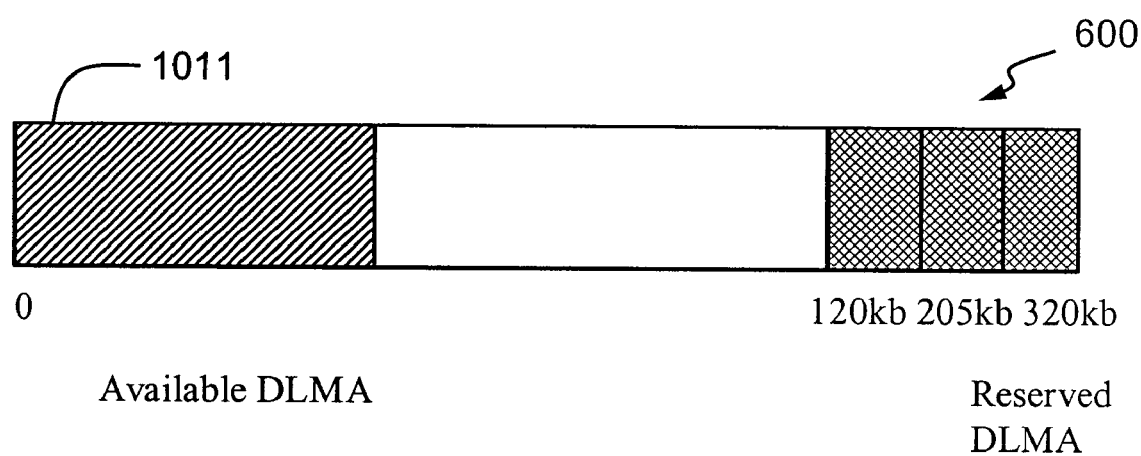
FIG. 10e shows the display list memory arena of FIG. 10a in a fifth state.

As an example, consider a four-page document to be printed on the printer 1815 using the display list memory arena 600. As seen in FIG. 10a, initially the display list memory arena 600 is empty. Then as seen in FIG. 10b, page one of the document to be printed is downloaded to the display list memory arena 600. Page one has two megabyte of display list data 1001 and three hundred and twenty (320) kilobytes of new glyph data 1002. The display list data is loaded at memory address zero (0) and the glyph data at is loaded at memory address {32 MB-320 kb}. FIG. 10c shows the display list memory arena 600 after page two of the document has been downloaded. Page two has three (3) megabytes of display list data 1003 and two hundred and five (205) kilobytes of new glyph data 1005. As seen in FIG. 10c, the display list data is loaded at address zero (0) and the glyph data is loaded at address {32 MB-525 kb}. The glyph data for page two refers to glyph data from page one. FIG. 10d shows the display list memory arena 600, after page three of the document is downloaded to the printer 1815. Page three has a one point five (1.5) megabytes of display list data 1007 and one hundred and twenty (120) kilo bytes of new glyph data 1009. The display list data 1007 is loaded at memory address zero (0) and the glyph data is loaded at memory address {32 MB-645 kb}. The display list data also refers to glyph data from the previous two pages. FIG. 10e shows the display list memory arena 600 after page four of the document to be rendered has been downloaded to the printer 1815. Page four has two (2) megabytes of display list data 1011 and no new glyph data. The display list data 1011 is loaded at address zero (0) and refers to previously downloaded glyph data.

In one implementation, the size of the reserved display list memory arena 602 is determined at the start of a document to be rendered and is fixed. Alternatively, the size of the reserved display list memory arena 602 may be dynamic, as shown in the above example. Dynamically determining the size of the reserved display list memory arena 602 provides the advantage of allowing the printer to utilize the maximum amount of available display list memory arena 601 at any time. Also, as shareable glyph data is added to the reserved display list memory arena 602, the size of display lists for each page to be rendered tends to decrease, since increasingly more references are made to the data already in the reserved display list memory arena 602.

A job control language (JCL) is a language that is typically understood by a printer controller, which is a software module resident in memory of a printer. A job control language allows requirements of each page to be included with a display list. Page requirements may comprise such information as number of copies, use of duplex printing and media-type. In one implementation, the job control language may be used to instruct the printer controller where to load display list data and the new glyph data into the display list memory arena 600.

In the above example, the spool file for page one may consist of:

Spooled file={load-address=0}+2 MB of display list data+{load-address=32 MB-320 kb}+320 kb of new glyph data.

Figure 11:
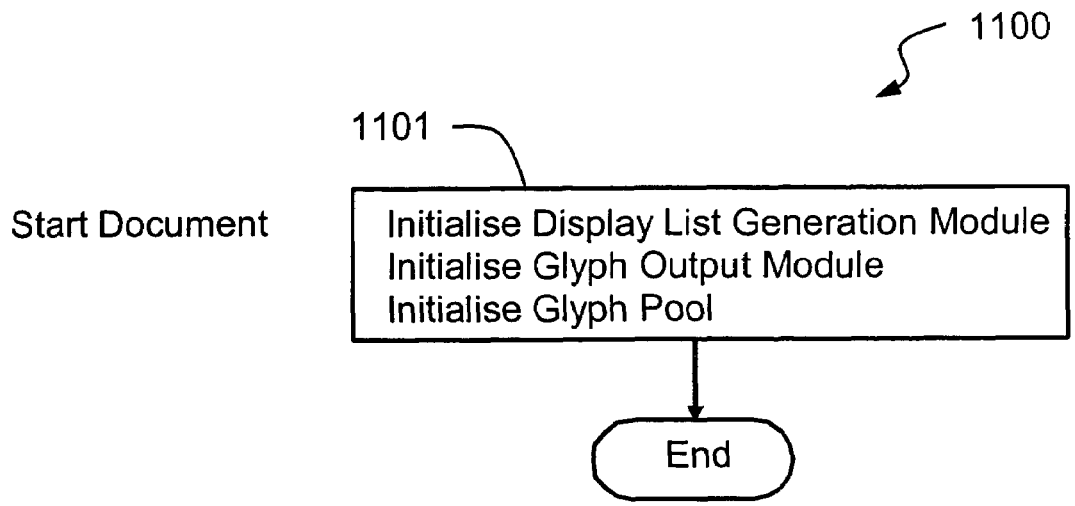
FIG. 11 is a flow diagram showing a process for starting the rendering of a document.

FIGS. 11 to 17 describe the method 100 of generating a display list in more detail than is shown in FIG. 1. FIG. 11 is a flow diagram showing a process 1100 for starting the rendering of a document. The process 1100 is preferably implemented as a portion of software code, which forms the printer driver 500. The process 1100 begins at step 1101, where the printer driver 500 receives a command from the graphics device interface layer indicating the start of a document. In response, the processor 1805 executing the printer module 500 initializes the display list generation module 501, glyph output module 503 and glyph pool module 505. The process 1100 then ends and the printer driver 500 returns execution to the graphics device interface layer. The process 1100 corresponds to row 803 of the table 801 of FIG. 8.

Figure 12:
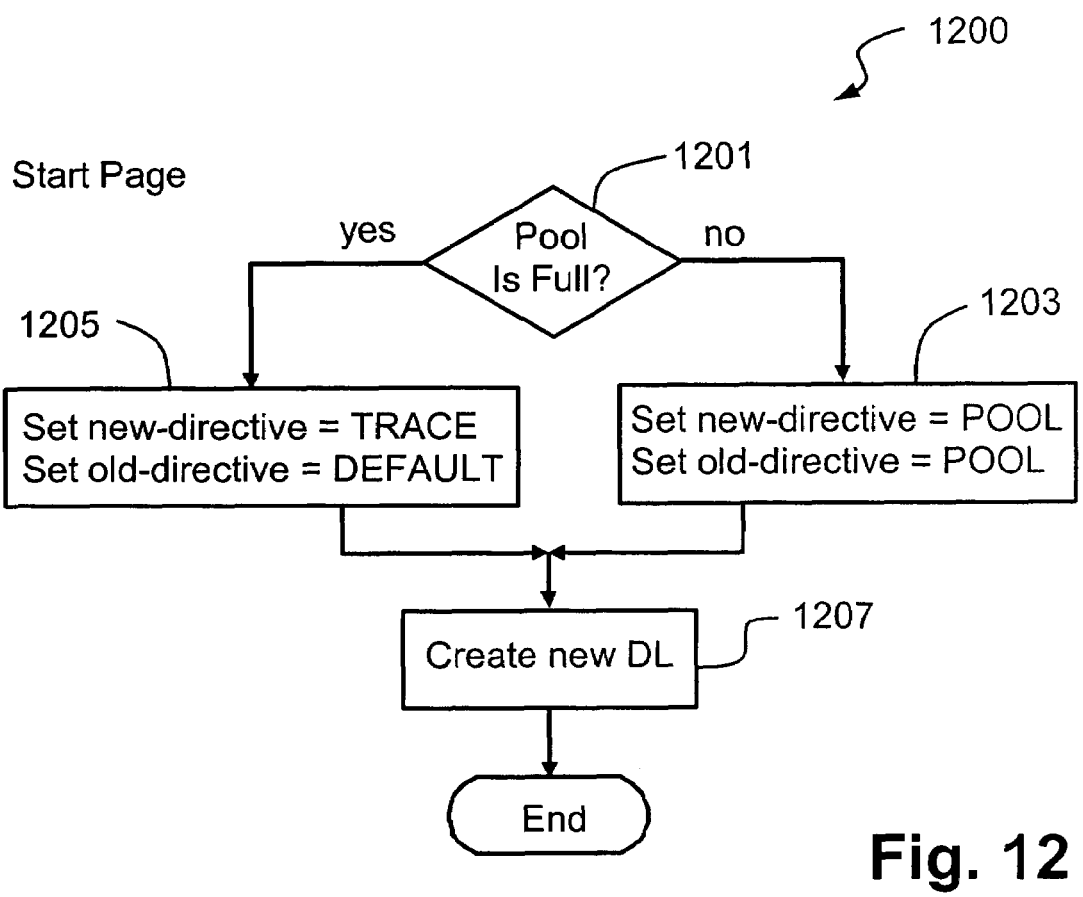
FIG. 12 is a flow diagram showing a process for starting the rendering of a page of the document of FIG. 11.

FIG. 12 is a flow diagram showing a process 1200 for starting the rendering of a page of the document of the process 1100 described above. The process 1200 of FIG. 12 corresponds to row 805 of table 801. The process 1200 is preferably implemented as a portion of software code, which forms the printer driver 500. The process 1200 begins at the first step 1201, when the processor 1805 executing the printer driver 500 receives a command from the graphics device interface layer indicating the start of a page. At step 1201 the processor 1805 determines if the glyph pool 505 is full.

If the glyph pool 505 is full, at step 1201, then the process 1200 proceeds to step 1205. Otherwise, the process 1200 proceeds to step 1203. At step 1205, the new-directive configured within memory 1806 is set to TRACE and the old-directive is set to DEFAULT. Step 1205 ensures that any new glyphs are added to any display list, configured in memory 1806 for the page, as edges, since the glyph pool 505 cannot accept any more bitmap data. Step 1205 also ensures that any old glyphs whose bitmap data has been added to the glyph pool 505 may be added to future display lists as bitmap primitives. The process 1200 then proceeds to step 1207, where a new display list is configured within memory 1806 before the process 1200 concludes and the printer driver 505 returns execution to the graphics device interface layer.

At step 1203, the new-directive configured within memory 1806 is set to POOL and the old-directive is set to POOL. Following step 1203, the process 1200 proceeds to step 1207, which executes as described above.

Figure 13:
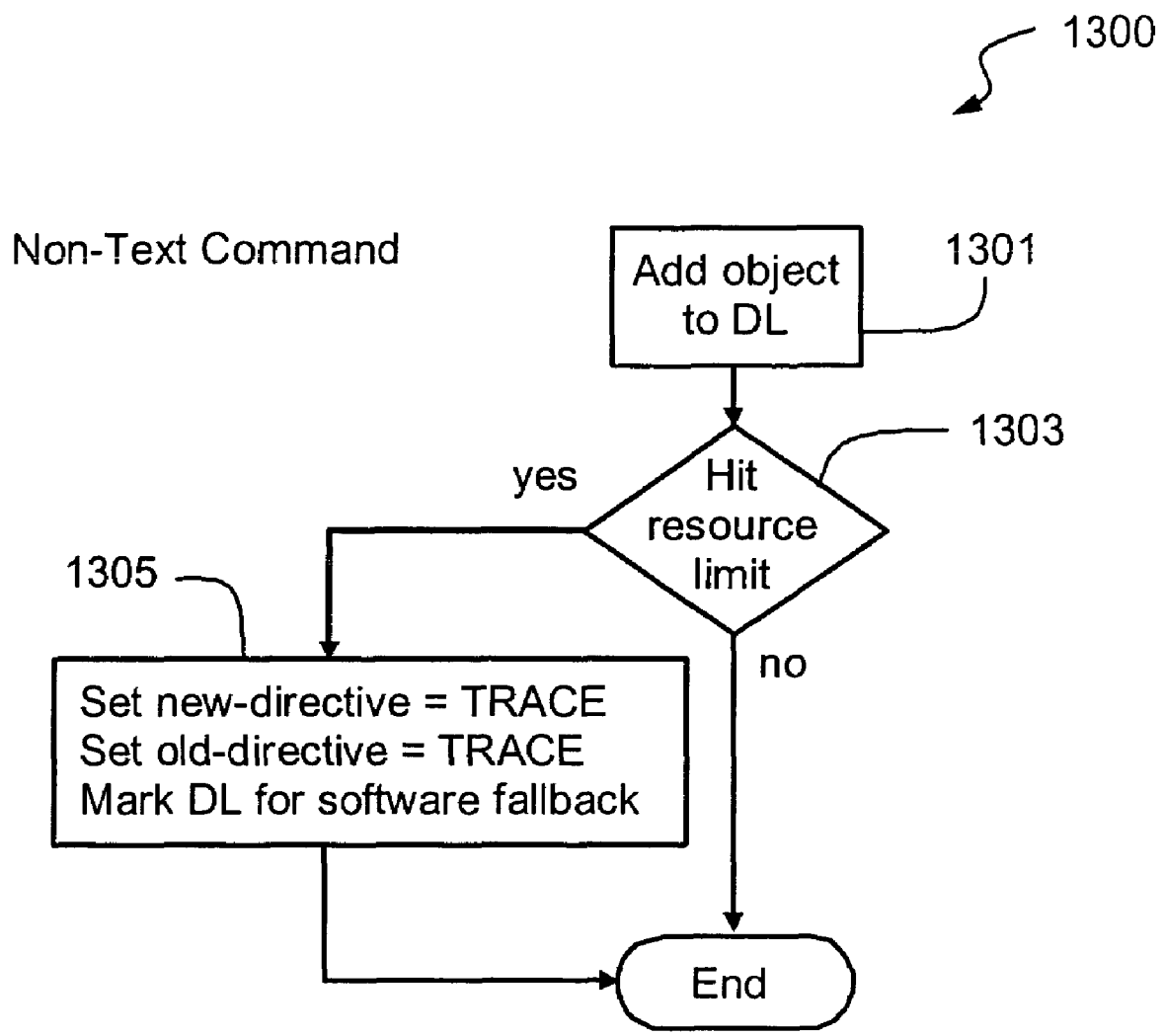
FIG. 13 is a flow diagram showing a process for processing a non-text graphics object.

FIG. 13 is a flow diagram showing a process 1300 for processing a non-text graphics object. The process 1300 is preferably implemented as a portion of software code, which forms the printer driver 500. The process 1300 begins at step 1301, where a non-text command is received by the printer driver 500 from the graphics device interface layer. At step 1301, the graphics object accompanying the command is added to the display list configured in memory 1806. At step 1303, if a resource limit was reached after processing the object, then the process 1300 proceeds to step 1305, otherwise the process 1300 concludes. At step 1305, the processor 1805 executing the printer driver 500 sets the new and old directives to TRACE, as shown in rows 807 and 815 of table 801 of FIG. 8. The display list configured within memory 1806 is marked for software fallback as defined in the state diagram 700 of FIG. 7. The process 1300 concludes following step 1305.

Figure 14:
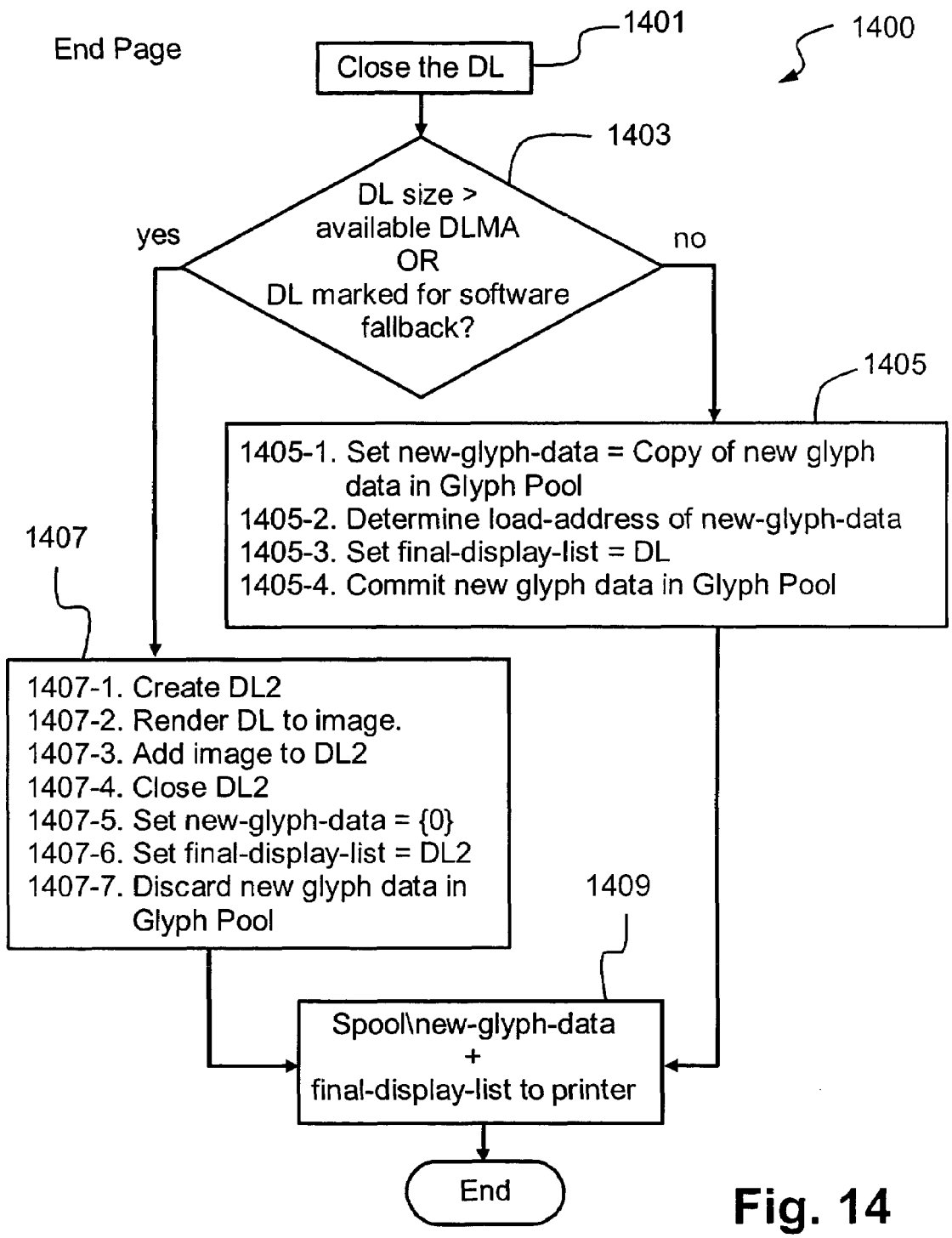
FIG. 14 is a flow diagram showing a process for ending the rendering of a page.

FIG. 14 is a flow diagram showing a process 1400 for ending the rendering of a page. The process 1400 corresponds to row 817 of table 801. The process 1400 is preferably implemented as a portion of software code, which forms the printer driver 500. The process 1400 begins at step 1401, where the printer driver 500 receives a command from the graphics device interface layer to end a page being rendered. At step 1401, the display list configured within memory 1806 is closed by the processor 1805 and the size of the display list is now known. At the next step 1403, the size of the display list is compared against the size of the available display list memory arena 601 of the printer 1815. If the available display list memory arena 601 is not large enough for the display list or the display list has been marked for software fallback, then the process 1400 proceeds to step 1407. Otherwise the process 1400 proceeds to step 1405. Step 1407 comprises a number of sub-steps 1407-1 to 1407-7, which will be described below.

At step 1407, a second display (DL2) list is created within memory 1806, at sub-step 1407-1, and the first display list is rendered to an image, at sub-step 1407-2, by a software raster image processor that resides with the printer driver 500. Once the entire page has been rendered to an image and added to the second display list, at sub-step 1407-3, the second display list (DL2) is closed at sub-step 1407-4. The new-glyph-data to spool to the printer is set to null, at sub-step 1407-5, and the final-display-list to spool to the printer 1815 is set to the second display list, at sub-step 1407-6. The glyph pool 505 performs a rollback, discarding a new glyph data, at sub-step 1407-7, and updating an associated valid glyph list. Following step 1407, the process 1400 proceeds to step 1409.

Similar to step 1407, step 1405 comprises a sub-steps 1405-1 to 1405-4. At step 1405, a copy of the new-glyph-data currently stored in the glyph pool 505 is made by the processor 1805 and assigned to the new-glyph-data to spool to the printer, at sub-step 1405-1. A load-address in the display list memory arena 600 of the printer is determined for the new glyph data, at sub-step 1405-2. Then the final display list to spool to the printer 1805 is set to the current display list, at sub-step 1405-3. The new glyph data is committed in the glyph pool 505, at sub-step 1405-4 and the last-commit-point is set to the value of a next-byte.

The process 1400 continues at the next step 1409, where the new-glyph-data (if any) and the generated (i.e., final) display list configured within memory 1806 are both spooled to the printer 1815. The process 1400 then terminates.

Figure 15:
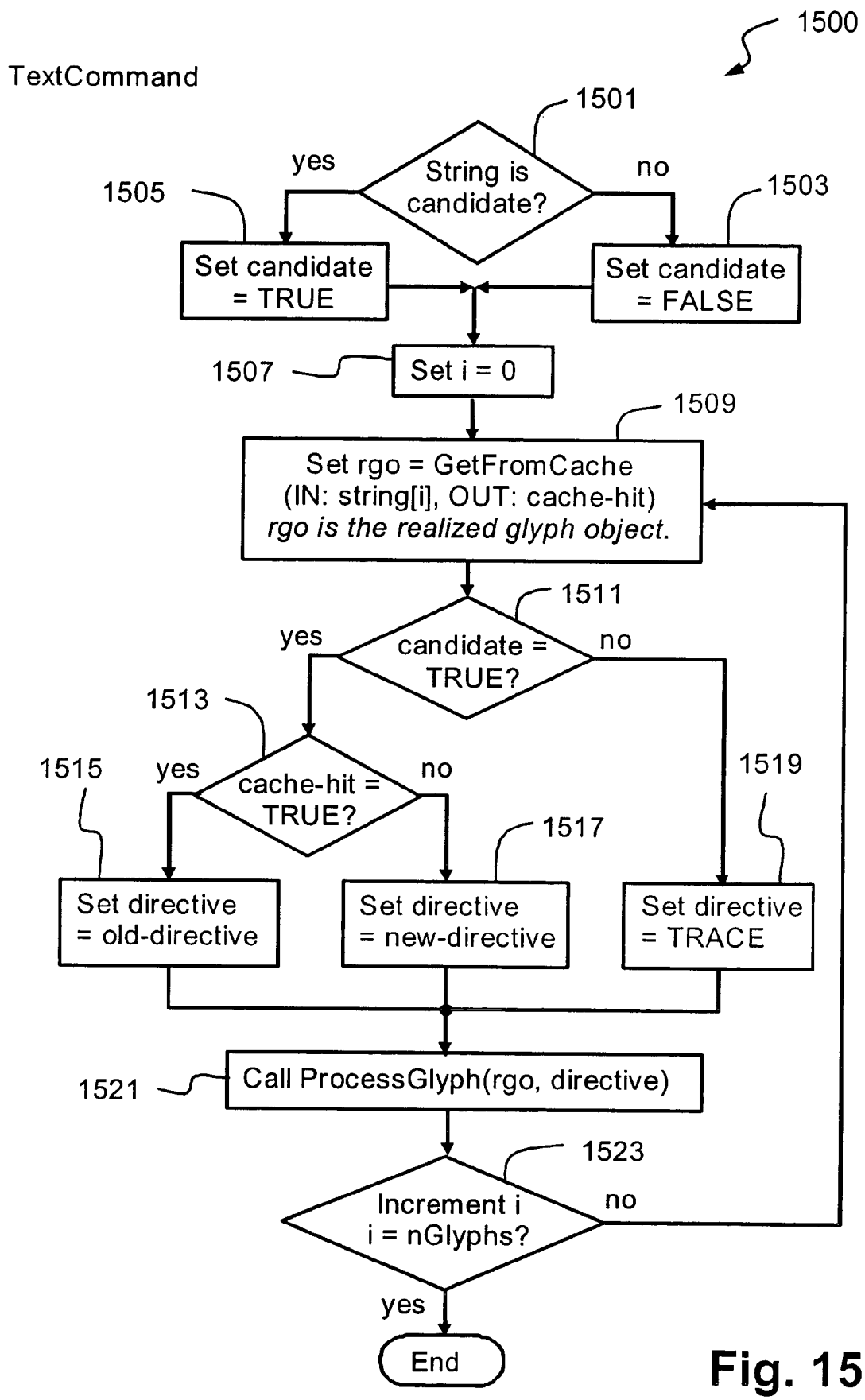
FIG. 15 is a flow diagram showing a process for processing a text object.

FIG. 15 is a flow diagram showing a process 1500 for processing a text object. The process 1500 is preferably implemented as a portion of software code, which forms the printer driver 500. The process 1500 begins at step 1501, where the printer driver 500 receives a command from the graphics device interface layer to draw a string of glyphs. At step 1501, the string of glyphs is examined to determine if the string is a candidate for sharing. If the string of glyphs is found to be a candidate, at step 1501, then the process 1500 proceeds to step 1505, where a variable "candidate" configured within memory 1806 is set to TRUE. Otherwise the process 1500 proceeds to step 1503, where the variable candidate is set to FALSE. At the next step 1507, a loop index, i, is initialized to zero (0) and the process 1500 proceeds to step 1509. At step 1509, a realized glyph object corresponding to the string object at index i is searched for in the glyph cache. If found, a variable "cache-hit" is set to TRUE by the processor 1805. Otherwise, the variable cache-hit is set to FALSE. In either case, a function with a tag "GetFromCache" returns a realized-glyph-object, "rgo". A process 1600 for retrieving a realized glyph object from a glyph cache, as executed at step 1509 will be described in more detail in FIG. 16 below.

The process 1600 then proceeds to step 1511, where if the processor 1805 determined that the string is a candidate, then the process 1500 proceeds to step 1513. Otherwise, the process 1500 proceeds to step 1519 where the variable "directive" configured within memory 1806 is set to TRACE.

At step 1513, the variable cache-hit is examined and if set to TRUE, then the glyph retrieved at step 1509 (i.e., the current glyph) existed previously in the glyph-cache and the process 1500 proceeds to step 1515. At step 1515, the processor 1805 sets the variable "directive" configured within memory 1806 to the value of the old-directive. If the variable cache-hit in step 1513 was found to be FALSE, then at step 1517, the variable directive is set to the value of the new-directive. The process 1500 then continues at step 1521. The glyph retrieved at step 1509 (i.e., the current glyph), represented by, rgo, is processed using the value of the variable directive. A process 1700 for processing the glyph as executed at step 1521 will be explained in detail below with reference to FIG. 17. Following step 1521, the process 1500 proceeds to step 1523 and the index counter, i, is incremented by one. If there are more glyphs in the string to process, then process 1500 returns to step 1509. Otherwise, the process 1500 concludes.

Figure 16:
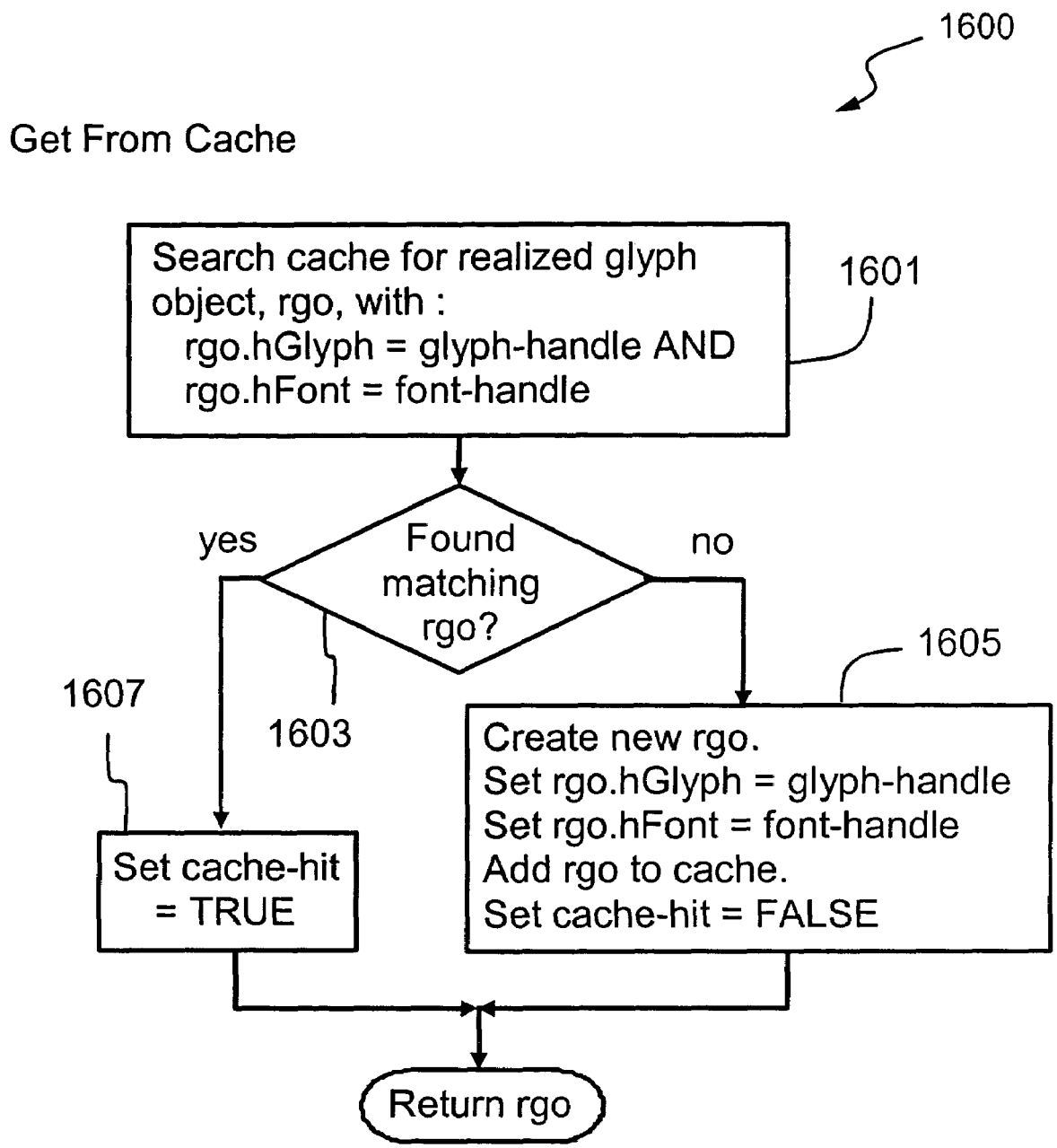
FIG. 16 is a flow diagram showing a process for retrieving a realized glyph object from a glyph cache.

The process 1600 for retrieving a realized glyph object, as executed at step 1509 of the process 1500, will now be explained with reference to FIG. 16. The process 1600 is preferably implemented as a portion of software code, which forms the printer driver 500.

The process 1600 begins at step 1601, where the glyph cache configured within memory 1806 is searched for a realized glyph object with a matching glyph handle and font handle to that provided with the string of glyphs command received by the printer driver 500 at step 1501. At the next step 1603, if a realized glyph object was not found, then the process 1600 proceeds to step 1605. At step 1605, a new realized glyph object is created by the processor 1805. The keys of the new realized glyph object are assigned the glyph and font handles that uniquely identify the new realized glyph object from others in the glyph cache configured within memory 1806. The new realized glyph object is added to the glyph cache, the variable cache-hit is set to FALSE and the process 1600 concludes with execution returning to step 1511 of the process 1500. Otherwise, if at step 1603, a realized glyph object was found, then the process 1600 proceeds to step 1607. At step 1607 the variable cache-hit is set to TRUE and the process 1600 concludes with execution returning to step 1511 of the process 1500.

The process 1700 for processing a glyph as executed at step 1521 of the process 1500 will now be explained with reference to FIG. 17. The process 1700 utilizes the variable directive and a realized glyph object, rgo. The process 1700 is preferably implemented as a portion of software code, which forms the printer driver 500.

The process 1700 begins at step 1701, where if the value of the variable directive is equal to POOL and the realized glyph object, rgo, does not have a valid entry in the glyph pool (i.e., indicating that the glyph data for the glyph should be added to the glyph pool 505), then the process 1700 proceeds to step 1703. At step 1703, the bitmap data for the glyph retrieved at step 1509 is determined and at the next step 1705 the bitmap data is added to the glyph pool 505. When the glyph pool 505 adds the new bitmap data the processor 1805 sets an entry in the valid-glyph-list and returns a corresponding pool-id, being an index into the valid glyph list. The processor 1805 also determines an absolute address in memory of the printer 1815 into which the glyph data will reside in the reserved display list management arena 602. Step 1705 allows the glyph output module 503 to patch an image-address of a bitmap record with the location corresponding to the absolute address for all future instances of the glyph retrieved at step 1509.

At the next step 1707, in the event that the step 1705 returns an invalid display list memory arena 600 address (i.e., a negative address), then the glyph pool 505 is full and the process 1700 proceeds to step 1711. At step 1711, the value of the new-directive variable is set to TRACE and the value of the old-directive variable is set to DEFAULT. Step 1711 corresponds to row 809 of table 801. Following step 1711, the process 1700 proceeds to step 1717.

If at step 1707, the display list memory arena 600 address is valid, then the valid address is stored in the corresponding realized glyph object, rgo at step 1709. The process 1700 then proceeds to step 1719 where the glyph is added to the display list configured within memory 1806 as a bitmap primitive. Also at step 1719, a bitmap record is created positioning the primitive on the page to be rendered, and the image address is assigned the value of a variable, "rgo.DLMAddress".

At step 1717, the current glyph is added to the display list as edge records and the process 1700 proceeds to step 1721. Once the glyph has been added to the display list, at step 1721, if a resource limit was hit (corresponding to row 811 of table 801), or in the case of step 1719, a bitmap limit was hit (corresponding to row 813 of table 801), then the process 1700 proceeds to step 1723. Otherwise the process 1700 concludes. At step 1723, the new-directive variable and the old-directive variable are both set to TRACE, and the display list configured within memory 1806 is now marked for software fallback. The process 1700 then concludes at step 1725.

At step 1701, if the value of the variable directive was not POOL or the value of directive was POOL but the glyph was already in the glyph pool 505, then the process 1700 proceeds to step 1713. If directive was set to TRACE, then the process 1700 proceeds to step 1717 which executes as described above. Otherwise the value of directive was not set to TRACE, so the process 1700 proceeds to step 1715. If the glyph is in the glyph pool 505, then the process 1700 proceeds to step 1719 which executes as described above. Otherwise the process 1700 proceeds to step 1717 which executes as described above.

When the printer driver 500 receives a command to end the document the processor 1805 executing the printer driver 500 frees any space in memory 1806 allocated by the display list generation module 501, glyph output module 503 and glyph pool module 505. Such freeing of space in memory 1806 which corresponds to row 819 of table 801.

As described above, a candidate string is a string of glyphs with certain predetermined criteria that mean rendering the glyphs as bitmap primitives is preferable to rendering the glyphs as edges. When a candidate string is determined where:

(i) no objects previously added to the display list lie directly beneath the region where the string is to be rendered on a page, and (ii) each individual glyph in the candidate string does not overlap any other glyph in the candidate string, and (iii) the associated fill of the candidate string is a flat color (e.g., flat black); the set of glyphs in the candidate string may be added to the display list as indexed bitmap primitives and rendered using the COPYPEN raster operation.

An indexed bitmap is a bitmap with an associated color lookup table, where each value in the bitmap refers to an entry in the color lookup table. The color lookup table is included as part of the bitmap record information of the bitmap primitive. Most rendering systems may render such a primitive.

Where a glyph of the candidate string has a bit depth of one bit-per-pixel, then the lookup table will have two entries. The first entry (index 0) is set to the color of the page (e.g., opaque white), if the shape of the glyph is defined in the ones, and the second entry (i.e., index 1) is set to the color of text on the page. Alternatively, if the shape of the glyph is defined in the zeros, the first entry (i.e., index 0) is set to the color of the text, and the second entry (i.e., index 1) is the set to the color of the page.

Adding the set of glyphs in the candidate string to the display list as indexed bitmap primitives and rendering the glyphs using the COPYPEN raster operation, is advantageous since destination pixel data does not need to be composited with source pixel data of the bitmap.

One method for determining whether objects lie directly beneath the region where a string of glyphs is to be rendered on a page is to configure the display list generation module 501 to cache the bounding box of each object as the object is added to the display list. In this instance, as a string of glyphs is added to the display list, the bounding box of the string of glyphs may be compared with the bounding boxes of previously added objects. If there is no intersection between the string of glyphs being added and the bounding boxes of previously added objects, then there are no objects beneath the string of glyphs being added to the display list.

Some rendering systems may render a one bit-per-pixel bitmap without an associated colour lookup table. In this instance, the bitmap may be considered to have an implicit color table where a value of zero in the bitmap represents opaque black and a value of one in the bitmap represents opaque white. Such a bitmap primitive is advantageous for rendering black text on a white page, since there is no need to access a color table.

Figure 19:
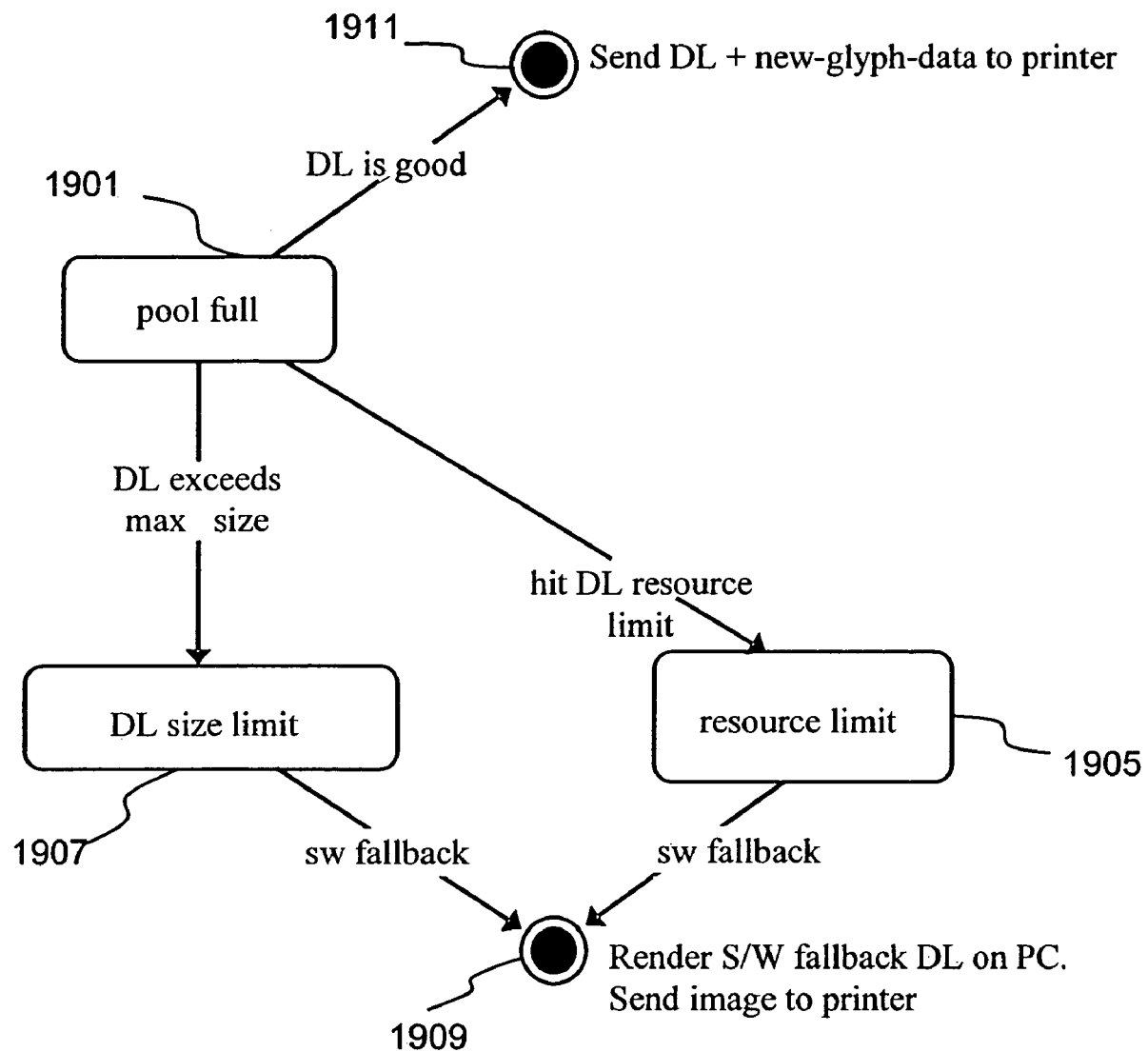
FIG. 19 shows a further state diagram of events as the events may occur.

For a page comprising entirely of glyphs that do not overlap other objects on the page, the maximum bitmap limit may be effectively ignored, since the maximum bitmap limit is a limit imposed by the ability of the rendering system to composite large numbers of bitmaps. For such pages, the state diagram 700 may be simplified to the state diagram 1900 of FIG. 19. As seen in FIG. 19, for such pages, a pool-full event 1901 may lead to a display list size limit event 1907. The pool-full event 1901 may also lead to a resource limit event 1905, or the pool-full event 1901 may result in a good display list that may be spooled to the printer 1815 (i.e., as represented by the point 1911 of the state diagram 1900). A resource limit event 1905 leads only to software fallback 1909. A display list (DL) size limit event 1907 also leads only to a software fallback display list being generated as represented by the point 1909 of the state diagram 1900.

For a candidate string conforming to the predetermined criteria (i), (ii) and (iii), immediately above, the process 1500 for processing a text object may be modified. In particular, at step 1505, the variable "candidate" configured within memory 1706 is set to TRUE, as above. However, if the associated fill of the string is a flat colour (i.e, criteria (iii)) and the string does not overlap objects previously added to the display list (i.e., criteria (i)), another variable "optimised-candidate" configured within memory 1706 is set to TRUE. Otherwise, the variable "optimised-candidate" is set to FALSE. Further, at step 1503, the variable candidate is set to FALSE, as above, and the variable optimised-candidate is set to FALSE. In this instance, steps 1719 and 1721 of the process 1700 are also modified.

At step 1719, the glyph is added to the display list configured within memory 1806 as an indexed bitmap primitive with an associated COPYPEN raster operation, if the optimised-candidate is set to TRUE. Otherwise, the glyph is added to the display list as a bitmap primitive, with an appropriate raster operation, if the optimised-candidate is set to FALSE. Then at step 1721, the processor 1805, only considers whether the resource limit was hit (corresponding to row 811 of table 801). In this instance, the bit map limit is not considered.

While the preceding description deals with the case where a single display list is associated with a single page of the document, alternative implementations are possible. For example, each page may be partitioned into a plurality of bands consisting of one or more scanlines, and each band of each page may be associated with a display list.

The aforementioned preferred method(s) comprise a particular control flow. There are many other variants of the preferred method(s) which use different control flows without departing the spirit or scope of the invention. Furthermore one or more of the steps of the preferred method(s) may be performed in parallel rather sequentially.

The foregoing describes only some embodiments of the present invention, and modifications and/or changes can be made thereto without departing from the scope and spirit of the invention, the embodiments being illustrative and not restrictive.

The claims defining the invention are as follows:

1. A method of generating a display list, for use in rendering a document comprising a plurality of glyphs, said method comprising the steps of:
   (i) setting a directive process a previously unused glyph;
   (ii) storing said previously unused glyph in said display list as a bitmap representation or as a vector representation, according to the directive, wherein said previously unused glyph is an existing font;
   (iii) updating the directive based upon a pre-determined criterion; and
   (iv) repeating steps (ii) and (iii) for at least a subsequent previously unused glyph to generate said display list, wherein said display list is persistent between pages of said document being rendered.

2. A method according to claim 1, wherein said display list is stored in a display list memory arena partitioned such that bitmap data associated with said bitmap representations are stored in a contiguous section of said display list memory arena.

3. A method according to claim 2, wherein the bitmap data in said contiguous bitmap data section of said display list memory arena is shared between one or more of said bitmap representations.

4. A method according to claim 3, wherein said one or more bitmap representations are associated with a same display list.

5. A method according to claim 3, wherein said one or more bitmap representations are associated with a plurality of display lists.

6. A method according to claim 2, wherein the display list memory arena is persistent between portions of said document.

7. A method according to claim 2, wherein at least one of said predetermined criteria is based on a predetermined size of the contiguous bitmap data section of said display list.

8. A method according to claim 1, wherein at least one of said predetermined criteria is based on a predetermined number of bitmap representations to be added to said display list.

9. A method according to claim 1, wherein at least one of said predetermined criteria is based on a predetermined number of glyphs to be added to said display list.

10. A method according to claim 1, wherein at least one of said predetermined criteria is based on a predetermined size of said display list memory arena.

11. A method according to claim 1, wherein said first one of said glyphs is stored in said display list as an indexed bitmap representation.

12. A method according to claim 11, wherein said first one of said glyphs is stored in said display list associated with a COPYPEN raster operation.

13. A method according to claim 11, wherein at least one of said predetermined criteria is based on said first one of said glyphs overlapping any objects previously added to said display list.

14. A method according to claim 1, wherein the display list is a final description of a page to be printed, including a description of graphics objects, generated by a printer driver.

15. A method of rendering a document comprising a plurality of glyphs, said method comprising the steps of:
(i) setting a directive to process a previously unused glyph;
(ii) storing said previously unused glyph in a display list as a bitmap representation or as a vector representation, according to the directive, wherein said previously unused glyph is an existing font;
(iii) updating the directive based upon a pre-determined criterion; and
(iv) repeating steps (ii) and (iii) for at least a subsequent previously unused glyph, wherein said display is persistent between pages of said document being rendered; and
(v) rendering said document using said display list.

16. An apparatus for generating a display list, for use in rendering a document comprising a plurality of glyphs, said apparatus comprising:
means for setting a directive to process a previously unused glyph,
means for storing said previously unused glyph in said display list as a bitmap representation or as a vector representation, according to the new-directive, wherein said previously unused glyph is an existing font;
means for updating the directive based upon a pre-determined criterion; and
means for storing at least a subsequent previously unused glyph in said display list as a bitmap representation or a vector representation, according to the updated directive, wherein said display list is persistent between pages of said document being rendered.

17. An apparatus for rendering a document comprising a plurality of glyphs, said apparatus comprising:
means for setting a directive to process a previously unused glyph;
means for storing said previously unused glyph in a display list as a bitmap representation or as a vector representation, according to the directive, wherein said previously unused glyph is an existing font;
means for updating the directive based upon a pre-determined criterion; and
means for storing at least a subsequent previously unused glyph in said display list as a bitmap representation or a vector representation, according to the updated directive, wherein said display list is persistent between pages of said document being rendered; and
means for rendering said document using said display list.

18. An apparatus for rendering a document comprising a plurality of pages, at least one of said pages comprising a plurality of glyphs, said apparatus comprising:
means for setting a directive to process a previously unused glyph;
means for storing said previously unused glyph in a display list as a bitmap representation or as a vector representation, according to the directive, wherein said previously unused glyph is an existing font;
means for updating the directive based upon a pre-determined criterion;
means for storing at least a subsequent previously unused glyph in said display list as a bitmap representation or a vector representation, according to the updated directive; and
means for rendering said document using said display list, said display list being partitioned such that data associated with said bitmap representations is stored in a contiguous section of said display list, wherein the contiguous bitmap data section of said display list is persistent between pages of said document being rendered.

19. A computer readable storage medium, having a computer program recorded thereon, wherein the program is configured to make a computer execute a procedure to generate a display list, for use in rendering a document comprising a plurality of glyphs, said program comprising:
code for setting a directive to process a previously unused glyph; and
code for storing said previously unused glyph in said display list as a bitmap representation or as a vector representation, according to the new directive, wherein said previously unused glyph is an existing font;
code for updating the directive based upon a pre-determined criterion; and
code for storing at least a subsequent previously unused glyph in said display list as a bitmap representation or a vector representation, according to the updated directive, wherein said display list is persistent between pages of said document being rendered.

20. A computer readable storage medium, having a computer program recorded thereon, wherein the program is configured to make a computer execute a procedure to render a document comprising a plurality of glyphs, said program comprising:
code for setting a directive to process a previously unused glyph;
code for storing said previously unused glyph in a display list as a bitmap representation or as a vector representation, according to the directive, wherein said previously unused glyph is an existing font;
code for updating the directive based upon a pre-determined criterion; and
code for storing at least a subsequent previously unused glyph in said display list as a bitmap representation or a vector representation, according to the updated directive, wherein said display list is persistent between pages of said document being rendered; and
code for rendering said plurality of glyphs using said display list.

21. A computer readable storage medium, having a computer program recorded thereon, wherein the program is configured to make a computer execute a procedure to render a document comprising a plurality of pages, at least one of said pages comprising a plurality of glyphs, said program comprising:
- code for setting a directive to process a previously unused glyph;
- code for storing said previously unused glyph in a display list as a bitmap representation or as a vector representation, according to the directive, wherein said previously unused glyph is an existing font;
- code for updating the new, directive based upon a pre-determined criterion;
- code for storing at least a subsequent previously unused glyph in said display list as a bitmap representation or a vector representation, according to the updated directive; and
- code for rendering said document using said display list, said display list being partitioned such that data associated with said bitmap representations is stored in a contiguous section of said display list, wherein the contiguous bitmap data section of said display list is persistent between pages of said document being rendered.

22. An apparatus for generating a display list, for use in rendering a document comprising a plurality of glyphs, said apparatus comprising:
- a memory for storing data and a computer program; and
- a processor coupled to said memory for executing said computer program, said computer program comprising instructions for:
- setting a directive to process a previously unused glyph;
- storing said previously unused glyph in said display list as a bitmap representation or as a vector representation, according to the directive, wherein said previously unused glyph is an existing font;
- updating the directive based upon a pre-determined criterion; and
- storing at least a subsequent previously unused glyph in said display list as a bitmap representation or a vector representation, according to the updated directive, wherein said display list is persistent between pages of said document being rendered.

23. An apparatus according to claim 22, wherein said apparatus forms part of a printing system.

24. An apparatus for rendering a document comprising a plurality of glyphs, said apparatus comprising:
- a memory for storing data and a computer program; and
- a processor coupled to said memory for executing said computer program, said computer program comprising instructions for:
- setting a directive to process a previously unused glyph;
- storing said previously unused glyph in a display list as a bitmap representation as a vector representation, according to the directive, wherein said previously unused glyph is an existing font;
- updating the directive based upon a pre-determined criterion;
- storing at least a subsequent previously unused glyph in said display list as a bitmap representation or a vector representation, according to the updated directive, wherein said display is persistent between pages of said document being rendered; and
- rendering said document using said display list.

25. An apparatus for rendering a document comprising a plurality of pages, at least one of said pages comprising a plurality of glyphs, said apparatus comprising:
- a memory for storing data and a computer program; and
- a processor coupled to said memory for executing said computer program, said computer program comprising instructions for:
- setting a directive to process a previously unused glyph;
- storing said previously unused glyph in a display list as a bitmap representation or as a vector representation, according to the directive, wherein said previously unused glyph is an existing font;
- updating the directive based upon a pre-determined criterion;
- storing at least a subsequent previously unused glyph in said display list as a bitmap representation or a vector representation, according to the updated directive; and
- rendering said document using said display list, said display list being partitioned such that data associated with said bitmap representations is stored in a contiguous section of said display list, wherein the contiguous bitmap data section of said display list is persistent between pages of said document being rendered.

26. A method according to claim 1, further comprising the steps of setting a second directive to store a previously used glyph, wherein said previously used glyph is an existing font.

27. A method according to claim 26, further comprising the step of storing said previously unused glyph in said display list as a bitmap representation or as a vector representation, according to the second directive.

28. A method according to claim 27, further comprising the step of updating the directive and the second directive based upon the pre-determined criterion.

* * * * *